US010645793B2

(12) United States Patent
Hassan et al.

(10) Patent No.: US 10,645,793 B2
(45) **Date of Patent: *May 5, 2020**

(54) AUTOMATIC TUNING OF DRESSED MULTICELL CAVITIES USING PRESSURIZED BALLOONS

(71) Applicant: Fermi Research Alliance, LLC, Batavia, IL (US)

(72) Inventors: Mohamed Awida Hassan, Aurora, IL (US); Donato Passarelli, Aurora, IL (US)

(73) Assignee: FERMI RESEARCH ALLIANCE, LLC, Batavia, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,843

(22) Filed: Oct. 26, 2019

(65) Prior Publication Data

US 2020/0100352 A1 Mar. 26, 2020

Related U.S. Application Data

(63) Continuation-in-part of application No. 16/140,845, filed on Sep. 25, 2018, now Pat. No. 10,485,088.

(51) Int. Cl.
*H02H 7/20* (2006.01)
*H05H 7/20* (2006.01)

(52) U.S. Cl.
CPC .................................... *H05H 7/20* (2013.01)

(58) Field of Classification Search
None
See application file for complete search history.

(56) References Cited

U.S. PATENT DOCUMENTS 7,746,192 B2 * 6/2010 McIntyre ................. H05H 7/18 315/505
8,324,134 B2 * 12/2012 Saito ........................ H05H 7/20 148/96

(Continued)

FOREIGN PATENT DOCUMENTS

WO WO-9527261 A1 * 10/1995 ............ G06T 9/008

OTHER PUBLICATIONS

J. Upadhyay, et al., "Apparatus and method for plasma processing of SRF cavities", Nuclear Instruments and Methods in Physics Research Section A: Accelerators, Spectrometers, Detectors and Associated Equipment, vol. 818, May 11, 2016, pp. 76-81.

(Continued)

*Primary Examiner* — Alexander H Taningco
*Assistant Examiner* — Srinivas Sathiraju
(74) *Attorney, Agent, or Firm* — Loza & Loza LLP; Kevin L. Soules

(57) ABSTRACT

A method and system for automatically tuning hollow structures, can include pressurized balloons located in one or more targeted cells of a hollow structure of a device having a hollow structures and respective cells. A pressurized balloon can be inserted into a targeted cell so as to localize plastic deformation to the targeted cell using prescribed values of global force and balloon pressure. A pair of inflate/deflate rods associated with an independent air supply for the pressurized balloon can inflate or deflate the pressurized balloon without affecting other pressurized balloons. The pair of inflate/deflate rods can be automatically insertable or removable from the hollow structure by controlled motorized motions.

20 Claims, 16 Drawing Sheets

(56) References Cited

U.S. PATENT DOCUMENTS

| | | | | |
|---|---|---|---|---|
| 8,673,820 | B2 * | 3/2014 | Roy | G01R 33/1238 148/668 |
| 8,903,464 | B1 * | 12/2014 | Myneni | H05H 7/20 29/599 |
| 9,023,765 | B1 * | 5/2015 | Rimmer | H01J 37/32009 505/450 |
| 9,485,849 | B1 * | 11/2016 | Vetter | H05H 7/22 |
| 9,527,261 | B1 * | 12/2016 | Roper | F16L 41/00 |
| 9,642,239 | B2 * | 5/2017 | Kephart | H05H 7/20 |
| 9,756,715 | B2 | 9/2017 | Biallas et al. | |
| 10,070,509 | B2 * | 9/2018 | Kephart | H05H 7/20 |
| 10,252,314 | B2 * | 4/2019 | Nohara | B21D 28/02 |
| 10,390,419 | B2 * | 8/2019 | Kephart | H05H 7/20 |
| 10,485,088 | B1 * | 11/2019 | Hassan | H05H 7/22 |
| 2002/0190670 | A1 * | 12/2002 | Pappo | H05H 7/20 315/500 |
| 2015/0020561 | A1 * | 1/2015 | Nohara | H05H 7/20 72/41 |
| 2015/0163895 | A1 * | 6/2015 | Biallas | H05H 7/20 285/18 |
| 2016/0045841 | A1 * | 2/2016 | Kaplan | B01J 19/0093 429/49 |
| 2017/0006695 | A1 * | 1/2017 | Jain | H02N 2/02 |
| 2017/0094770 | A1 * | 3/2017 | Kephart | H05H 7/20 |
| 2017/0113259 | A1 * | 4/2017 | Nohara | H01P 1/2082 |
| 2017/0215268 | A1 * | 7/2017 | Myneni | H05H 7/20 |

OTHER PUBLICATIONS

"Superconducting radio frequency", https://en.wikipedia.org/wiki/Superconducting_radio_frequency, downloaded Jun. 29, 2018.

"Superconducting radio frequency," adapted from the Wikipedia entry "Superconducting radio frequency" (as of Aug. 2013).

"SRF Accelerator Research & Development", Fermi National Accelerator Laboratory, May 2016.

William Miles Soyars, "SRF cavity testing status and operating experience", AIP Conference Proceedings 1434, 1108 (2012); doi: 10.1063/1.4707031.

Perry B. Wilson, "High Energy Linacs: Applications to Storage Ring RF Systems and Linear Colliders", SLAC-PUB-2884 (Rev.), Nov. 1991.

Valery Shemelin, et al., "Systematical study on superconducting radio frequency elliptic cavity shapes applicable to future high energy accelerators and energy recovery linacs", Physical Review Accelerators and Beams, 19, 102002 (2016).

"Dressed RFD Cavities, Functional Requirements Specification", Reference : LHC-ACFDC-ES-0001, CERN, Feb. 6, 2017.

"Radiofrequency cavities", CERN, https://home.cern/about/engineering/radiofrequency-cavities, downloaded Jul. 3, 2018.

Thomas Peterson, et al., "A Survey of Pressure Vessel Code Compliance for Superconducting RF Cryomodules", FERMILAB-PUB-11-252-AD-TD.

H. Padamsee, "Design Topics for Superconducting RF Cavities and Ancillaries", https://arxiv.org/ftp/arxiv/papers/1501/1501.07129.pdf.

Robert Kephart, et al., "Compact Superconducting Radio-frequency Accelerators and Innovative RF Systems", Fermilab-Conf-15-129-DI, Apr. 10, 2015, World Innovation Conference, 2015.

C. Darve, et al., "The Superconducting Radio-Frequency Linear Accelerator Components for the European Spallation Source: First Test Results", Proceedings of LINAC2016, East Lansing, MI, USA, 2016.

A. Akai, et al., "RF systems for the KEK B-Factory", Nuclear Instruments and Methods in Physics Research A 499 (2003) 45-65.

Notice of Allowance including List of References, Non-Patent Literature, and List of References, dated Jul. 17, 2019, U.S. Appl. No. 16/140,845.

* cited by examiner

AUTOMATIC TUNING OF DRESSED MULTICELL CAVITIES USING PRESSURIZED BALLOONS

CROSS REFERENCE TO PATENT APPLICATION

This patent application is a Continuation-in-Part of U.S. patent application Ser. No. 16/140,845 entitled "Radio Frequency Tuning of Dressed Multicell Cavities Using Pressurized Balloons," which was filed on Sep. 25, 2018 and is incorporated herein by reference in its entirety.

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

Embodiments are generally related to SRF (Superconducting Radio Frequency) cavities utilized in linear accelerator devices and systems. Embodiments additionally relate to SRF linear accelerators that employ multicell cavities. Embodiments further relate to the use of pressurized balloons in multicell cavities in SRF applications.

BACKGROUND

Linear accelerator devices use intense radio frequency electromagnetic fields to accelerate the speed of particles to create beams used for a variety of applications. These applications include driving industrial processes, security & imaging applications, food and medical sterilization, medical treatments, isotope creation and physics research. SRF (Superconducting Radio Frequency) technology allows for the construction of linear accelerators that are both compact and efficient at using "wall plug" electrical power to create a particle beam.

SRF accelerating cavities are commonly used in linear accelerators or particle accelerators. Due to their very small RF losses, much higher acceleration efficiencies, and higher continuous wave (CW) accelerating fields than normal conducting cavities, SRF cavities are now considered the device of choice for many of today's leading applications in high energy and nuclear physics, including energy recovery linear accelerators (ERLs), linear colliders, neutrino factories, spallation neutron sources, and rare isotope accelerators. These projects place enormous demands not only on advances in beam performance, but also on more reliable and economic methods for fabrication, assembly, and operation.

Some SRF linear accelerators may employ the use of multicell cavities rather than simply a single cavity. Multicell cavities must meet certain requirements to operate properly in a particle accelerator in terms of resonance frequency, field flatness and eccentricity. Cavities are typically tuned to meet these requirements by plastic deformation. Tuning must be accomplished before welding a helium vessel to the bare cavity when there is access to the cavity's cells. Dressed cavities, however, can become detuned during the preparation, testing, and qualification process, which basically renders them unusable for the cryomodule assembly. Currently, a straightforward process does not exist for tuning dressed cavities other than cutting the helium vessel to access the outer surface of a cavity cell, then tune the bare cavity and dress it back. This typically has a significant impact on the cost and the schedule of large-scale particle accelerator projects, which can include, for example, hundreds of cavities.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved SRF linear accelerator method and system.

It is another aspect of the disclosed embodiments to provide for a noninvasive tuning method and system capable of handling dressed cavities in an SRF linear accelerator without removing an associated helium vessel.

It is a further aspect of the disclosed embodiments to provide for an SRF linear accelerator tuning method and system that relies on plasticity deforming of a multicell cavity by introducing customized balloons and then pressurizing such balloons at targeted cells while applying a global force on the cavity flanges.

It is a further aspect of the disclosed embodiments to implement an SRF linear accelerator system in which the aforementioned pressurized balloons localize the plastic deformation to targeted cells using prescribed values of both global force and balloon pressure.

It is another aspect of the disclosed embodiments to provide for automatic balloon tuning for multicell SRF cavities in particle accelerator systems.

The aforementioned aspects and other objectives and advantages can now be achieved as described herein.

In an embodiment, a system for automatically tuning hollow structures, can include: a plurality of pressurized balloons located in at least one targeted cell of a hollow structure of a device having a plurality of hollow structures and a plurality of respective cells, wherein at least one pressurized balloon among the plurality of pressurized balloons is inserted into the at least one targeted cell so as to localize plastic deformation to the at least one targeted cell using prescribed values of global force and balloon pressure with respect to the at least one pressurized balloon; and a pair of inflate/deflate rods associated with an independent air supply for the at least one pressurized balloon, wherein the pair of inflate/deflate rods inflates or deflates the at least one pressurized balloon without affecting other pressurized balloons among the plurality of pressurized balloons, wherein the pair of inflate/deflate rods is automatically insertable or removable from the hollow structure by controlled motorized motions.

In an embodiment of the system, an automatic bead insertion/removal telescope mechanism can be further include, which inserts into or removes a bead from the hollow structure.

In an embodiment of the system, the at least one pressurized balloon can be subject to automatic coarse tuning operations.

In an embodiment of the system, the at least one pressurized balloon can be subject to automatic fine-tuning operations.

In an embdiment of the system, the aforementioned device can comprise an SRF (Superconducting Radio Frequency) cavity for use in a particle accelerator.

In an embodiment of the system, the pair of inflate/deflate rods can carry the at least one pressurized balloon, and the pair of inflate/deflate rods can be automatically inserted or removed from the SRF cavity by controlled motorized motions at least one rail.

In an embodiment of the system, the at least one pressurized balloon can comprise a rubberized/nylon balloon.

In an embodiment of the system, the hollow structure can comprise a cavity.

In an embodiment of the system, the cavity can comprise at least one of: a multicell elliptical cavity among a plurality of adjacent cavities, and a dressed multicell cavity among a plurality of adjacent cavities.

In an embodiment of the system, the hollow structure can comprise a filter.

In another embodiment, a system for automatically tuning hollow structures, can include a plurality of pressurized balloons located in at least one targeted cell of a hollow structure of a device having a plurality of hollow structures and a plurality of respective cells, wherein at least one pressurized balloon among the plurality of pressurized balloons is inserted into the at least one targeted cell so as to localize plastic deformation to the at least one targeted cell using prescribed values of global force and balloon pressure with respect to the at least one pressurized balloon; a pair of inflate/deflate rods associated with an independent air supply for the at least one pressurized balloon, wherein the pair of inflate/deflate rods inflates or deflates the at least one pressurized balloon without affecting other pressurized balloons among the plurality of pressurized balloons, wherein the pair of inflate/deflate rods is automatically insertable or removable from the hollow structure by controlled motorized motions; and an automatic bead insertion mechanism that inserts a bead into the hollow structure.

In an embodiment of the aforementioned system, the at least one pressurized balloon can be subject to at least one of: automatic fine-tuning operations and automatic coarse tuning operations.

In another embodiment, a method for automatically tuning hollow structures, can involve: locating a plurality of pressurized balloons in at least one targeted cell of a hollow structure of a device having a plurality of hollow structures and a plurality of respective cells; inserting at least one pressurized balloon among the plurality of pressurized balloons into the at least one targeted cell so as to localize plastic deformation to the at least one targeted cell using prescribed values of global force and balloon pressure with respect to the at least one pressurized balloon; associating a pair of inflate/deflate rods with an independent air supply for the at least one pressurized balloon; and inflating or deflating the at least one pressurized balloon with the pair of inflate/deflate rods without affecting other pressurized balloons among the plurality of pressurized balloons, wherein the pair of inflate/deflate rods is automatically insertable or removable from the hollow structure by controlled motorized motions.

An embodiment of the method can further inovle inserting into or removing a bead from the hollow structure with an automatic bead insertion/removal telescope mechanism that inserts into or removes the bead from the hollow structure.

An embodiment of the method can further involve subjecting the at least one pressurized balloon to automatic coarse tuning operations.

An embodiment of the method can further involve subjecting the at least one pressurized balloon to automatic fine-tuning operations.

In an embodiment of the method, the device can comprise an SRF (Superconducting Radio Frequency) cavity for use in a particle accelerator.

In an embodiment of the method, the pair of inflate/deflate rods can carry the at least one pressurized balloon, and the pair of inflate/deflate rods can be automatically inserted or removed from the SRF cavity by controlled motorized motions at least one rail.

In an embodiment of the method, the at least one pressurized balloon can comprise a rubberized/nylon balloon.

In an embodiment of the method, the hollow structure can comprise a cavity comprising at least one of: a multicell elliptical cavity among a plurality of adjacent cavities, and a dressed multicell cavity among a plurality of adjacent cavities.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
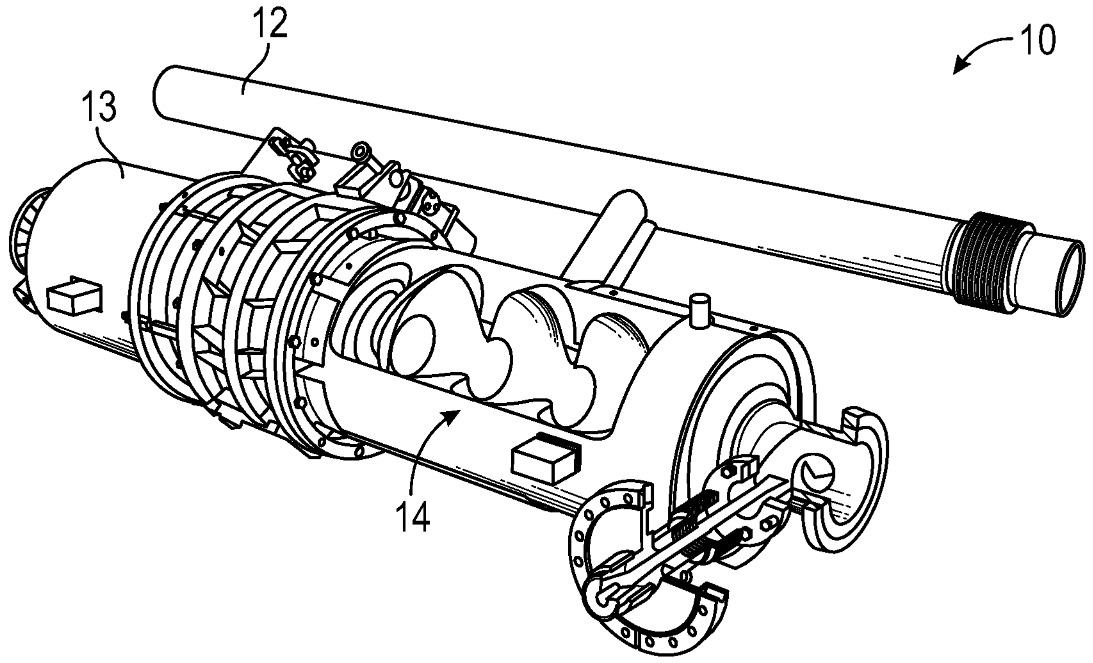
FIG. 1 illustrates a sectional cut-away view of a portion of an SRF dressed cavity (with helium vessel), which may be implemented in accordance with an example embodiment.

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to." The term "at least one" conveys "one or more".

FIG. 1 illustrates a sectional cut-away view of a portion of an SRF device 10, which may be implemented in accordance with an example embodiment. The SRF device 10 can be used, for example, in the context of an SRF linear accelerator, also referred to herein as a particle accelerator. The SRF device 10 generally includes a cylindrically shaped body comprising a helium vessel 13 in which one or more cavities 14 (i.e., multicell cavities) are disposed. The cylindrically shaped body of the helium vessel 13 forms the wall of the helium vessel 13, which that surrounds the cavities 14. The cavity or cavities 14 are cooled in a liquid helium bath through the helium vessel 13. Note that the helium vessel 13 is often pumped to a pressure below helium's superfluid lambda point to take advantage of the superfluid's high thermal conductivity properties. Because superfluid possesses a very high thermal conductivity, it makes an excellent coolant.

The cylindrically shaped body of the helium vessel 13 further engages with a cooling cylinder 12. Each of the cavities 14 may be composed of a metallic material that is superconducting at a cavity operating temperature. This material may constitute the entire cavity or be a coating on an inner surface of each linear accelerator cavity. In one example embodiment, each cavity of the multicell cavities 14 may comprise pure niobium. In other example embodiments, each cavity may be, but not limited to, for example, a niobium, an aluminum or a copper cavity coated in niobium-tin ($Nb_3Sn$) or other superconducting materials. The cavities are associated with one or more helium vessels. As will be discussed in greater detail herein, the disclosed embodiments allow for the non-invasive tuning of dressed cavities without removing the helium vessel(s) such as the helium vessel 13.

It should be appreciated that although the embodiments discussed herein generally involve the use of a hollow structure such as the aforementioned cavity, the disclosed embodiments are suitable for locally deforming any hollow structure that is not accessible from the outside of the cavity for one reason or another, and which is composed of multiple segments. Such a hollow structure may be a cavity, a filter, and so on.

Figure 2:
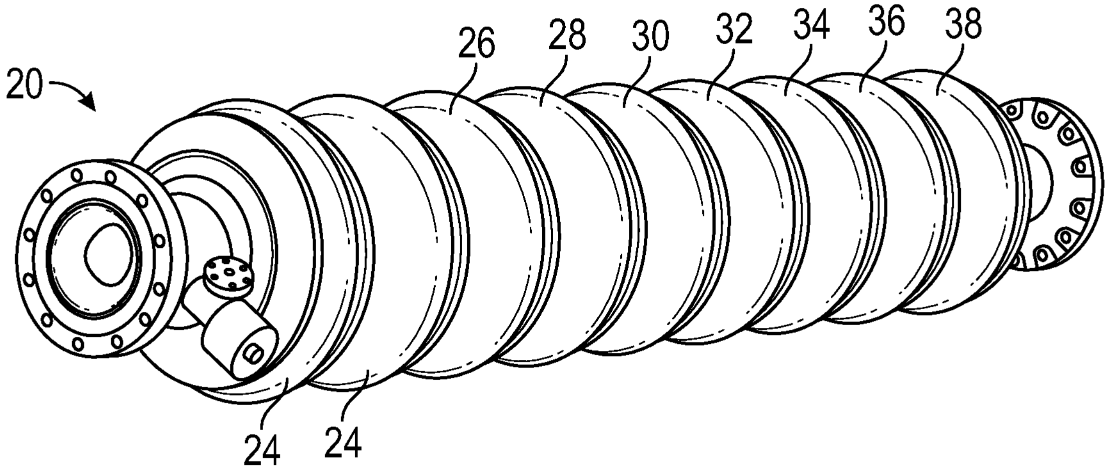
FIG. 2 illustrates a perspective view of an SRF multi-cell elliptical cavity (bare with no helium vessel) that can be implemented in a linear accelerator device such as the SRF device shown in FIG. 1, in accordance with another example embodiment.

FIG. 2 illustrates a perspective view of an SRF linear accelerator system 20 that can be implemented in a linear accelerator device such as the SRF device 10 shown in FIG. 1, in accordance with another example embodiment. The SRF linear accelerator system 20 depicted in FIG. 2 includes a plurality of SRF cavities 22, 24, 26, 28, 30, 32, 34, 36, and 38, which as will be explained in greater detail herein, can temporarily host pressurized balloons located within each of the cavities 22, 24, 26, 28, 30, 32, 34, 36, and 38. Note that each cavity 22, 24, 26, 28, 30, 32, 34, 36, and 38 contains a respective cavity cell. Each cavity cell has an elliptical shape and can thus be utilized in the context of a multicell elliptical cavity arrangement.

It should be appreciated that the number of multicell cavities shown in FIGS. 1-2, for example, should not be considered a limiting feature of the present invention. Although only nine cells 22, 24, 26, 28, 30, 32, 34, 36, and 38 are shown in the particular example depicted in FIG. 2, an SRF linear accelerator system 20 may be implemented with fewer or more cells (e.g., hundreds of cavities and associated cavity cells), depending on the nature and goal of the particular accelerator project.

Note that a non-limiting example of an SRF linear accelerator system in which the disclosed embodiments can be implemented is disclosed in U.S. Patent Application Publication No. 20170094770 entitled "Compact SRF Based Accelerator," which published on Mar. 30, 2017 to Robert Kephart and is incorporated herein by reference in its entirety. It should be appreciated that the SRF linear accelerator system disclosed in non-limiting U.S. Patent Application Publication No. 20170094770 is but one example of a compact SRF based linear or particle accelerator in which the disclosed methods and systems can be utilized. The disclosed devices, systems and techniques can be implemented in the context of other types and sizes of SRF based linear or particle accelerators.

Figure 3:
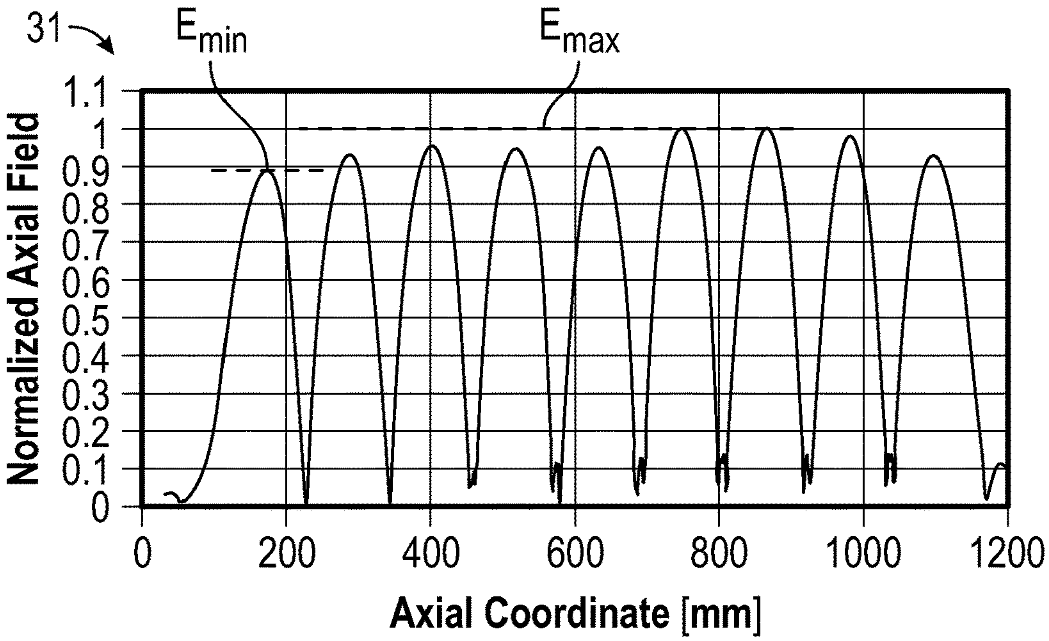
FIG. 3 illustrates a graph of FF (Field Flatness) associated with multicell cavities, in accordance with an example embodiment.
Figure 4:
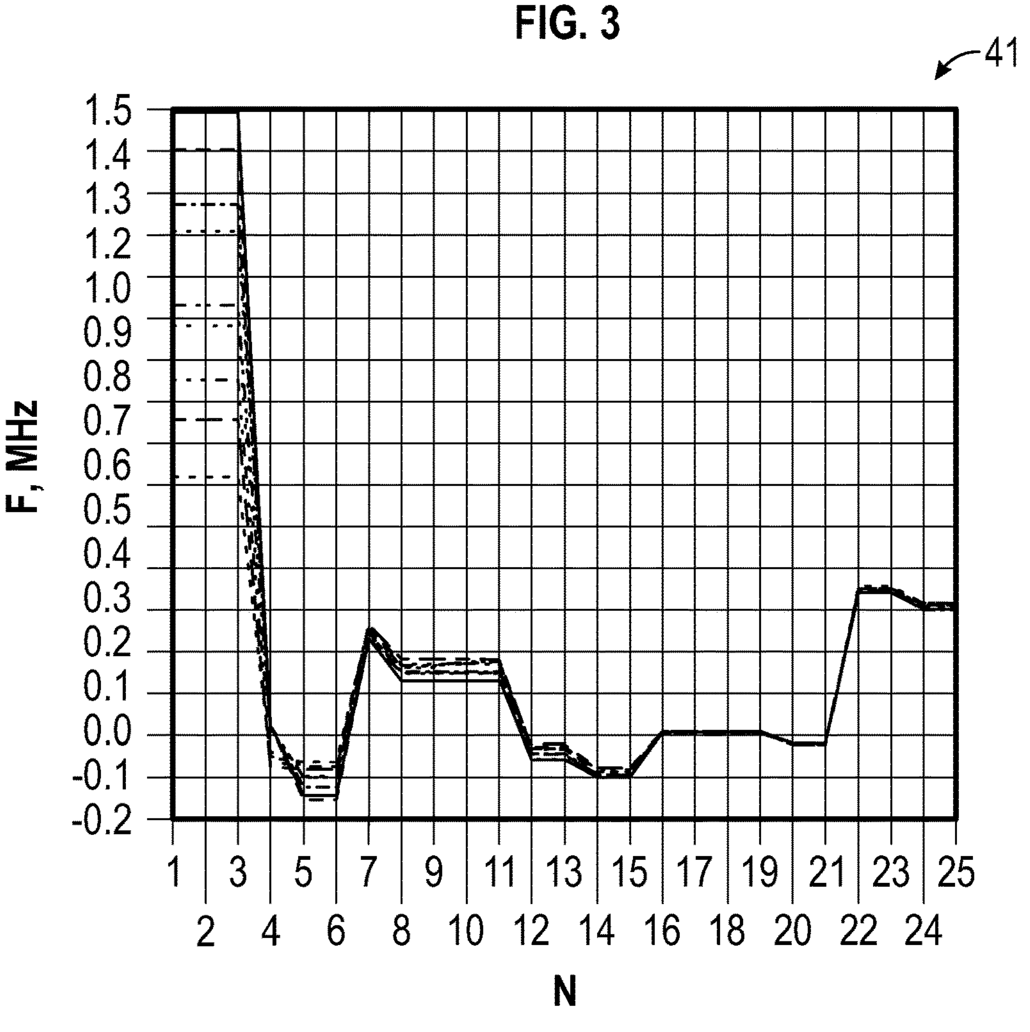
FIG. 4 illustrates a graph of resonance frequency ($f_{pi}$) associated with multicell cavities, in accordance with an example embodiment.

The graphs shown in FIGS. 3-4 generally illustrate the vitals of example multicell SRF cavities. FIG. 3 illustrates a graph 31 of FF (Field Flatness) associated with multicell cavities, in accordance with an example embodiment. Graph 31 shown in FIG. 3 plots data regarding the Normalized Field Amplitude (y-axis) versus Axial Position (x-axis) to provide an indication of FF (Field Flatness), which is a figure of merit for the uniformity of the electric field inside the cavity $FF=E_{min}/E_{max}$. For example, for FF>98%, 90% is typically required for bare and dressed cavities.

FIG. 4 illustrates a graph 41 of resonance frequency ($f_{pi}$) associated with multicell cavities, in accordance with an example embodiment. A warm cavity has to be in a certain frequency range at room temperature in order to meet a target frequency range of 2K.

Figure 5:
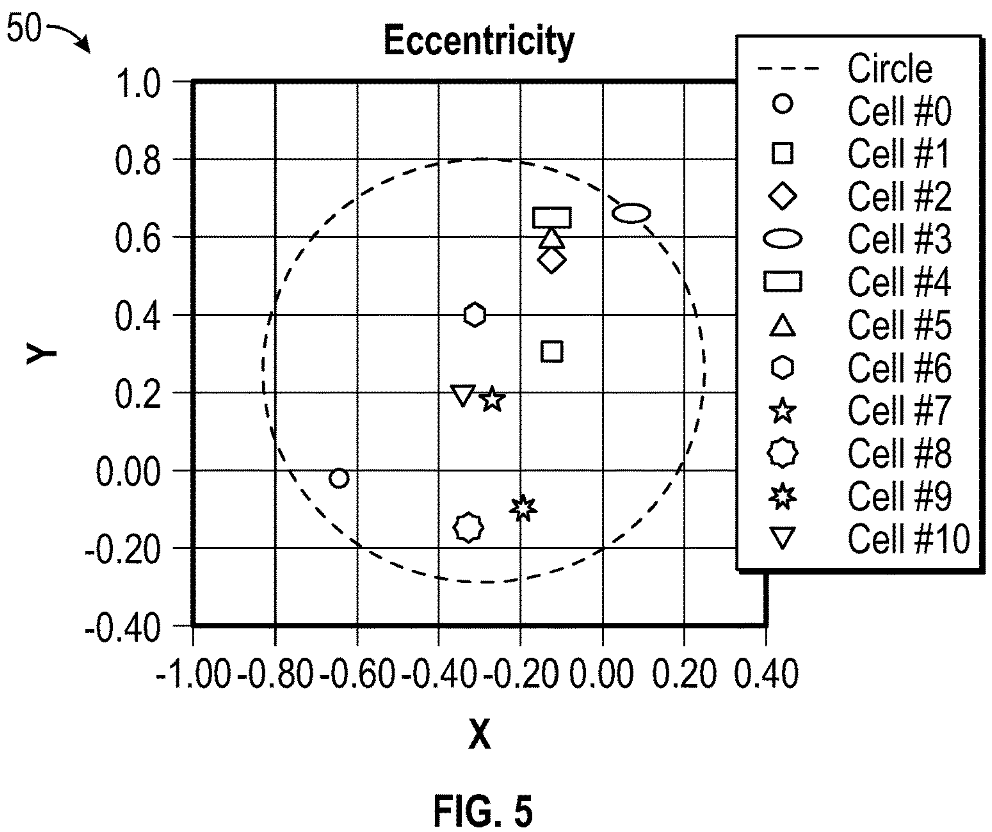
FIG. 5 illustrates a graph of Eccentricity (Ecc) associated with multicell cavities, in accordance with an example embodiment.

FIG. 5 illustrates a graph 51 of Eccentricity (Ecc) associated with multicell cavities, in accordance with an example embodiment. Ecc is a figure of merit that indicates the quality of the alignment of the various cavity cells. Ecc>0.5 mm is typically required and is considered "good".

Figure 6:
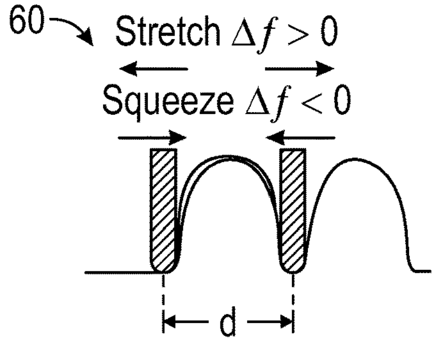
FIG. 6 illustrate a schematic diagram demonstrating how frequency and FF can be adjusted by stretching and squeezing cells beyond an elastic limit, in accordance with a conventional tuning technique.
Figure 7:
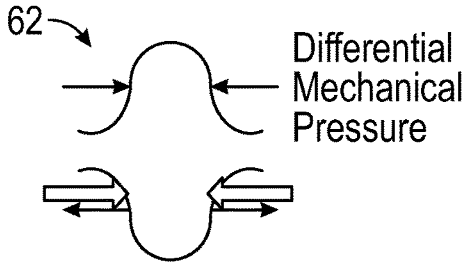
FIG. 7 illustrates a schematic diagram demonstrating how alignment can be adjusted by differential mechanical forces, in accordance with a conventional tuning technique.

FIG. 6 illustrates a schematic diagram 60 demonstrating how stretching and squeezing cells beyond an elastic limit, in accordance with a conventional tuning technique, can adjust frequency and FF. For example, stretching is indicated in the schematic diagram 60 for $\Delta f>0$ and squeezing is indicated for $\Delta f<0$. FIG. 7, on the other hand, illustrates a schematic diagram 62 demonstrating how differential mechanical forces, in accordance with a conventional tuning technique, can adjust alignment.

Figure 8A:
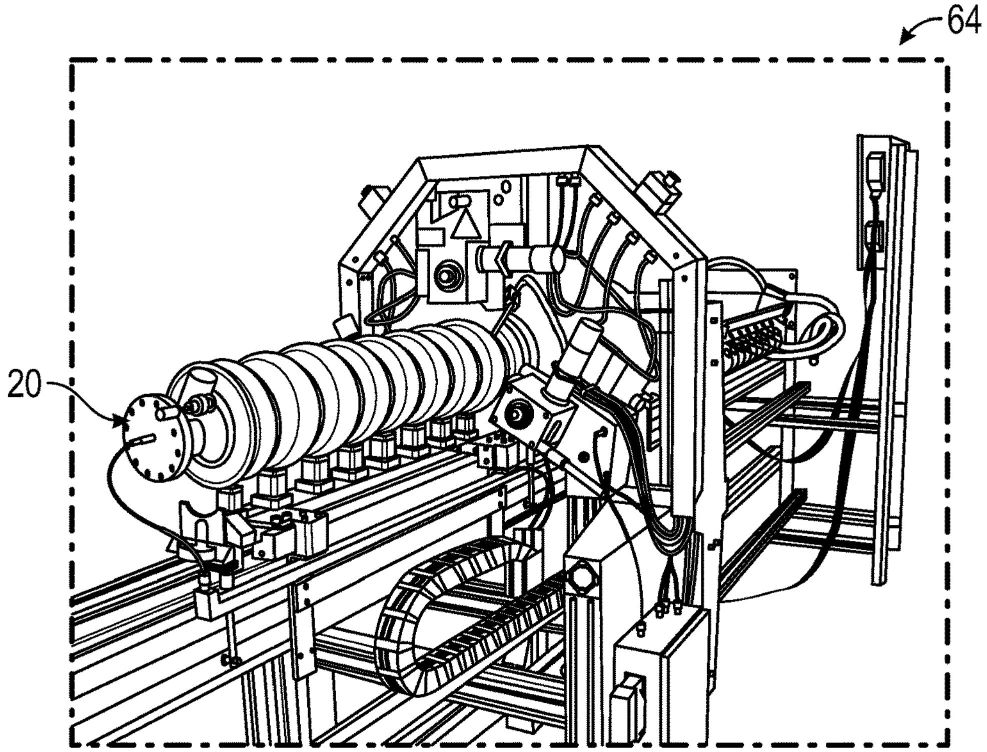
FIG. 8A illustrate an image of an SRF system involving automatic tuning for bare cavities, in accordance with a conventional tuning technique.

FIG. 8A illustrates an image of an SRF system 64 involving automatic tuning for bare cavities, in accordance with a conventional tuning technique. The example SRF system 64 shown in FIG. 8 generally includes an SRF multicell cavity or apparatus such as the SRF linear accelerator system 20 discussed previously. The configuration or set up shown in the image depicted in FIG. 8A generally involves automatic tuning for bare cavities (without the balloon(s) implementations discussed herein).

Figure 8B:
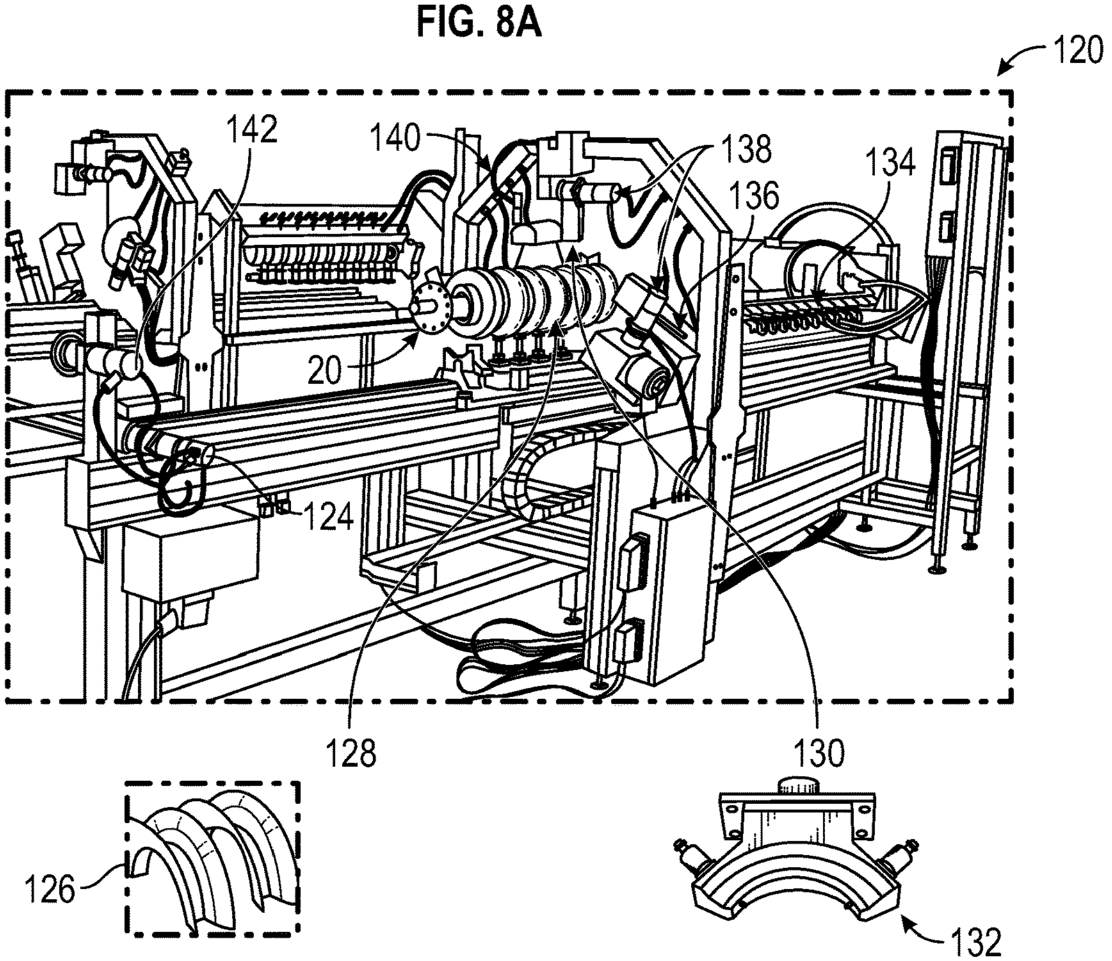
FIG. 8B illustrates an image of a cavity tuning system, also in accordance with a conventional tuning technique.

FIG. 8B illustrates an image of a cavity tuning system 120, also in accordance with a conventional tuning technique. The cavity tuning system 120 shown in FIG. 8B generally includes conventional tuning and includes the SRF linear accelerator system 20 with its various cavities, as shown centrally in the image of FIG. 8B. The system 120 shown in FIG. 8B can include a tuning frame 140 with three independent jaws along with a jaws motor 138. Jaws linear actuator (x3) 136 can also be provided in addition to an eccentricity measurement system 134. Tuning jaws (x6) 132 and protective shields such as a protective shield 128 can be further provided. A protective shield can be provided with respect to each cavity for a total of, for example, 10 protective shields. The system 120 can further includes a base motor frame 124 and a bead pull motor 142.

Figure 9:
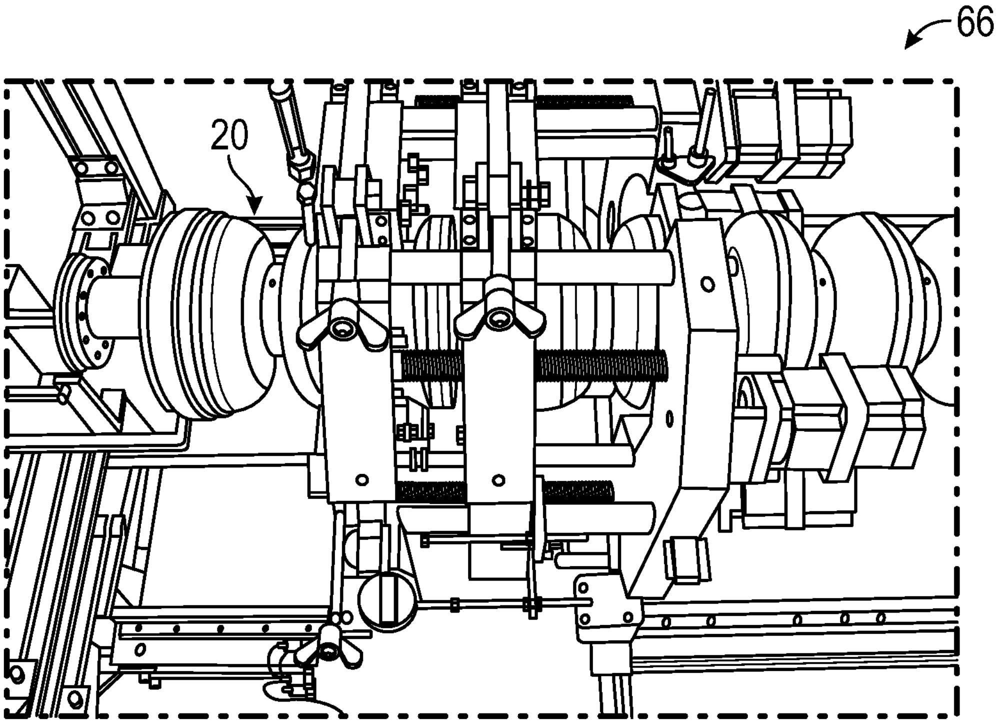
FIG. 9 illustrates an image of an SRF system involving manual tuning for bare cavities, in accordance with a conventional tuning technique.

FIG. 9 illustrates an image of an SRF system 66 involving manual tuning for bare cavities, in accordance with a conventional tuning technique. The SRF system 66 shown in FIG. 9 can also employ an SRF multicell cavity or apparatus such as SRF linear accelerator system 20 discussed previously. FIGS. 8A-8B and FIG. 9 thus generally demonstrate tuning with respect to cavities without the disclosed balloon implementations.

Figure 10:
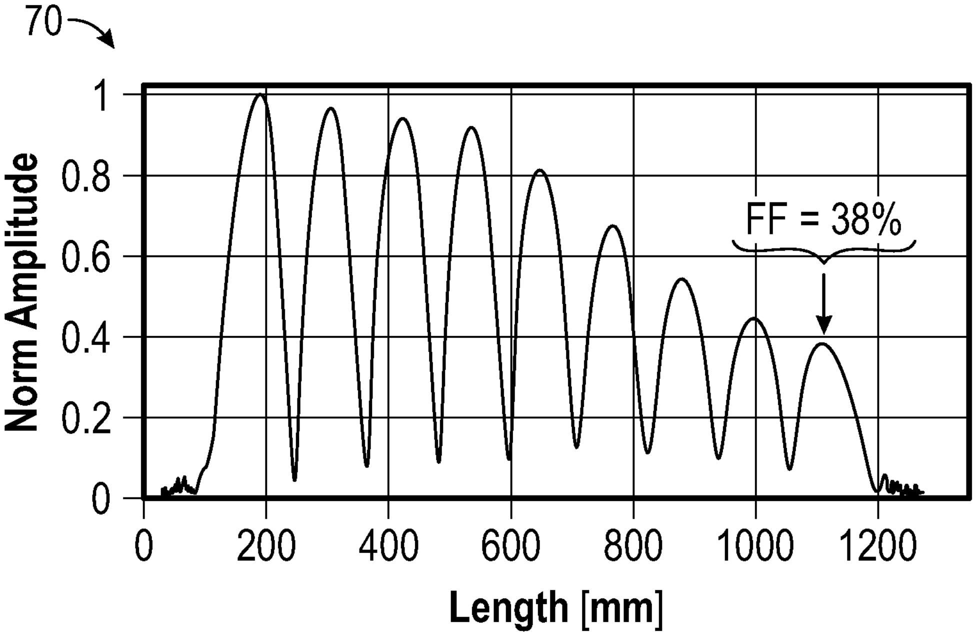
FIG. 10 illustrates a graph depicting data indicative of a dressed cavity that became accidentally deformed.

FIG. 10 illustrates a graph 70 depicting data indicative of a dressed cavity that became accidentally deformed during the long qualification and testing process. In graph 70, normalized amplitude (y-axis) is plotted versus length (x-axis) in mm.

Dressed cavities can become accidentally deformed during the aforementioned qualification and testing process. As discussed previously herein, there currently does not exist a straightforward device and/or a technique that effectively tunes dressed cavities other than cutting the vessel and then tuning the bare cavity and dressing it back. This conventional approach typically has a significant impact on cost and schedule.

The graph 70 shown in FIG. 10 is an example of a dressed cavity that "went bad". The disclosed balloon device and related techniques were thus developed by the present inventors to address this problem. Note that as utilized herein, the terms "dressed cavities" or "dressed cavity" generally refers to an integrated assembly wherein a niobium cavity has been permanently joined to a cryogenic containment vessel, such that the cavity is surrounded by cryogenic liquid during operation.

Figure 11:
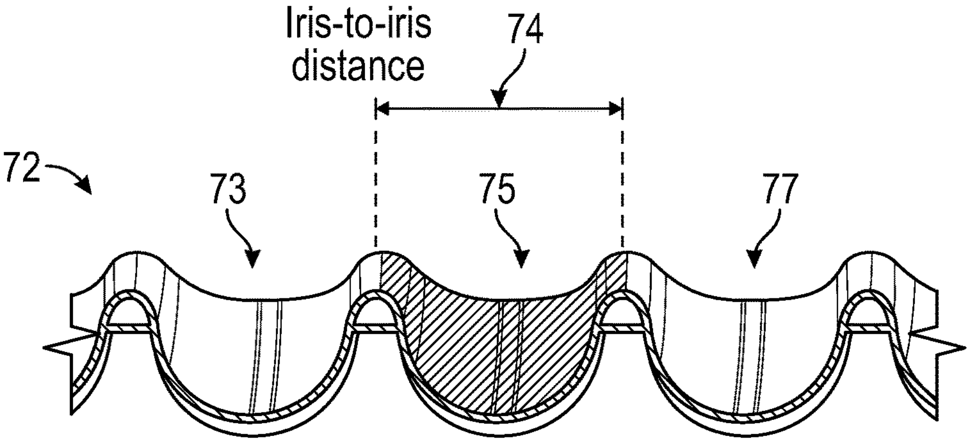
FIG. 11 illustrates a cut-away view of a multicell arrangement including the iris-to-iris distance, in accordance with an example embodiment.
Figure 12:
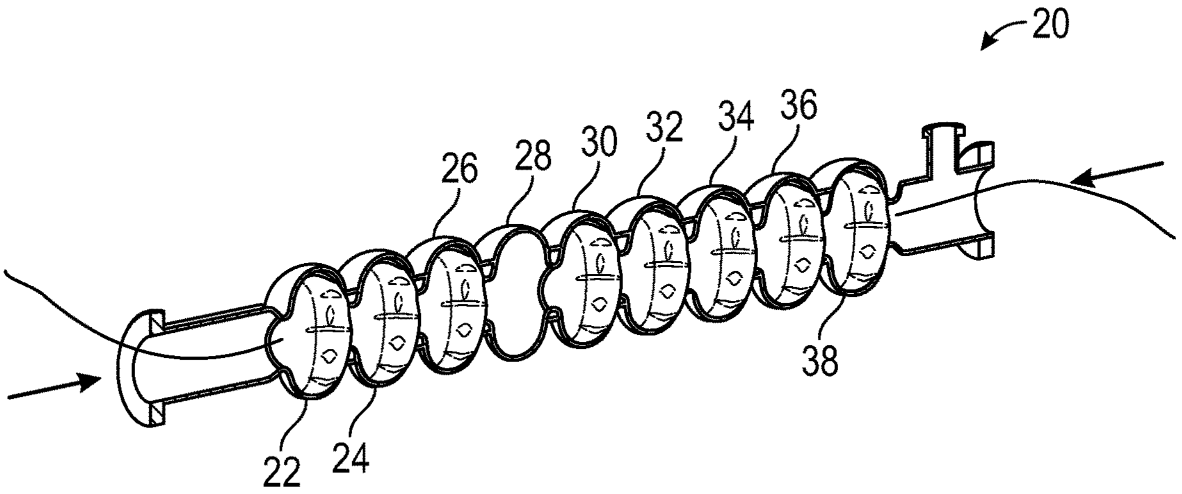
FIG. 12 illustrates a schematic diagram of a multicell linear accelerator with cell compression identified, in accordance with an example embodiment.

FIG. 11 illustrates a cut-away view of a multicell arrangement 72 including an example of iris-to-iris distance 74, in accordance with an example embodiment. In FIG. 11, three example cells 73, 75 and 77 are shown (or at least a portion of such cells). FIG. 12 illustrates a schematic diagram of a multicell cavity 20 with cell compression identified, in accordance with an example embodiment. Balloons to be inserted in the marked cells. In FIG. 12 areas of lower stress (marked cells) and high stress are indicated along with global force during cell compression.

Figure 13:
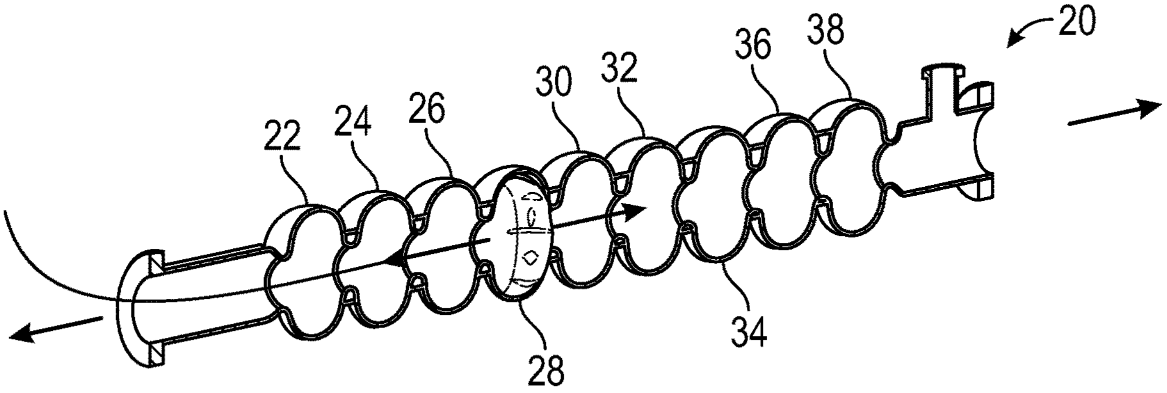
FIG. 13 illustrates a schematic diagram of a multicell linear accelerator with cell expansion identified, in accordance with an example embodiment.

FIG. 13 illustrates a schematic diagram of the SRF linear accelerator system 20 with cell expansion identified, in accordance with an example embodiment. Balloons to be inserted in the marked cell. In FIG. 13, a higher stress area (marked cell) is indicated and a lower stress area is shown in addition to the global force and local pressure force.

The basic concept behind the disclosed embodiments is thus to use pressurized balloons from cavity's inside surface to apply forces on targeted cells and localize plastic deformation. The target cell thus gets plastically deformed and the other cells remain in the linear elastic region because of lower stresses.

Figure 14:
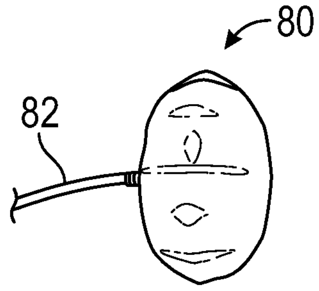
FIG. 14 illustrates an image of a balloon configured from rubberized nylon, in accordance with an example embodiment.

FIG. 14 illustrates a sketch of a balloon 80 configured from rubberized nylon, in accordance with an example embodiment. A rod or hose 82 is connected to the balloon 80 as shown in FIG. 14. It should be appreciated that although the balloon 80 can be configured from a rubberized nylon material, it can be appreciated the balloon 80 may be configured from other types of materials. In other words, the use of rubber for balloon 80 is not a limiting feature of the disclosed embodiments. In other embodiments, other types of materials may be utilized in place of rubber to configure the balloon 80. Reference is made to rubber herein only for illustrative and exemplary purposes only.

Figure 15:
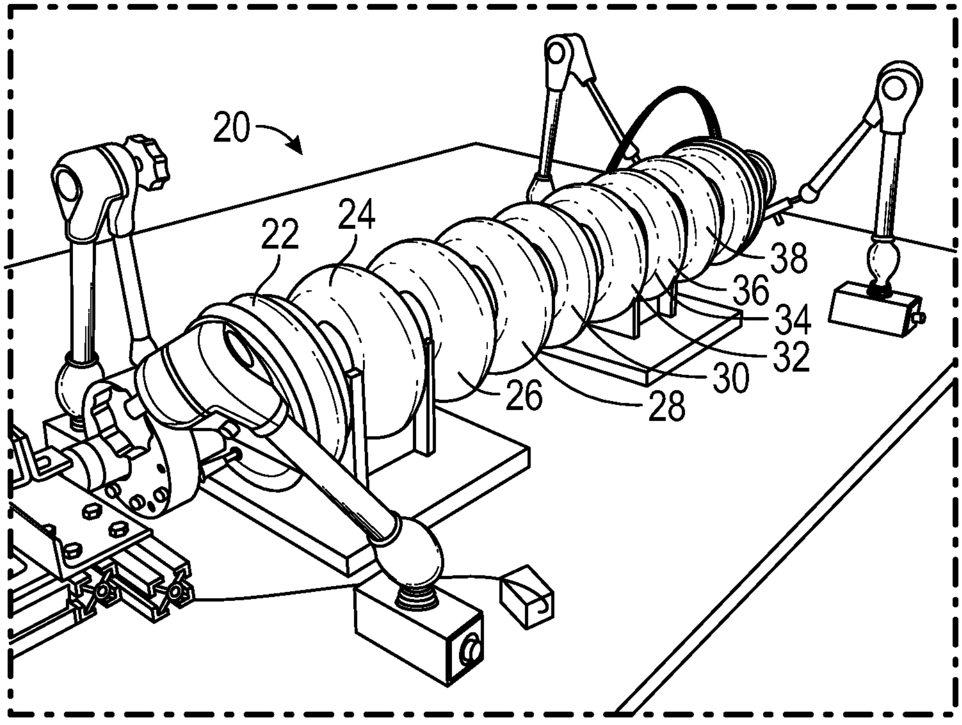
FIG. 15 illustrate an image of an SRF accelerator device including multicell cavities filled with pressurized balloons such as the balloon shown in FIG. 14, in accordance with an example embodiment.
Figure 16:
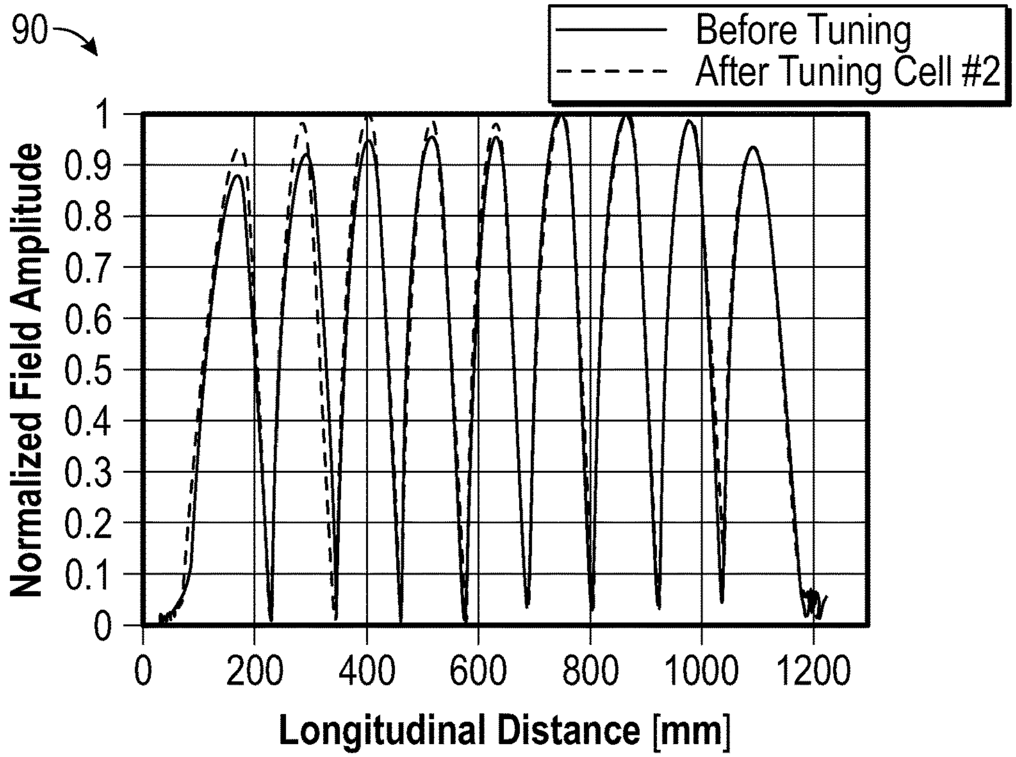
FIG. 16 illustrate a graph demonstrating normalized field amplitude (y-axis) versus longitudinal distance (x-axis) before tuning and after tuning, in accordance with an example embodiment.

FIG. 15 illustrate an image of the SRF linear accelerator system 20 including multicell cavities 22, 24, 26, 28, 30, 32, 34, 36, and 38 filled with pressurized balloons such as the balloon shown in FIG. 14, in accordance with an example embodiment. The arrangement shown in FIG. 15 was used to demonstrate the disclosed balloon tuning technique initially on a bare cavity (e.g. cell #2). The graph 90 shown in FIG. 16 demonstrates normalized field amplitude (y-axis) versus longitudinal distance (x-axis) before tuning and after tuning, in accordance with an example embodiment. The data thus shows an approximately 92.5% field flatness after balloon tuning demonstrating success in the use of pressurized balloons.

Figure 17:
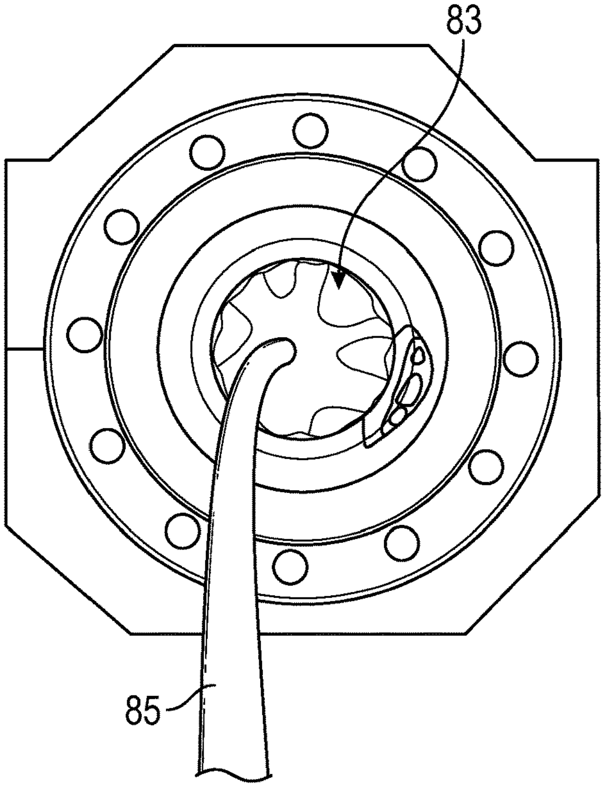
FIG. 17 illustrates an image of a balloon located in a cavity, in accordance with an example embodiment.

FIG. 17 illustrates an image of a balloon 83 located inside a cavity, in accordance with an example embodiment. A tube 85 connects to the balloon 83 and is shown protruding from the cavity.

Figure 18:
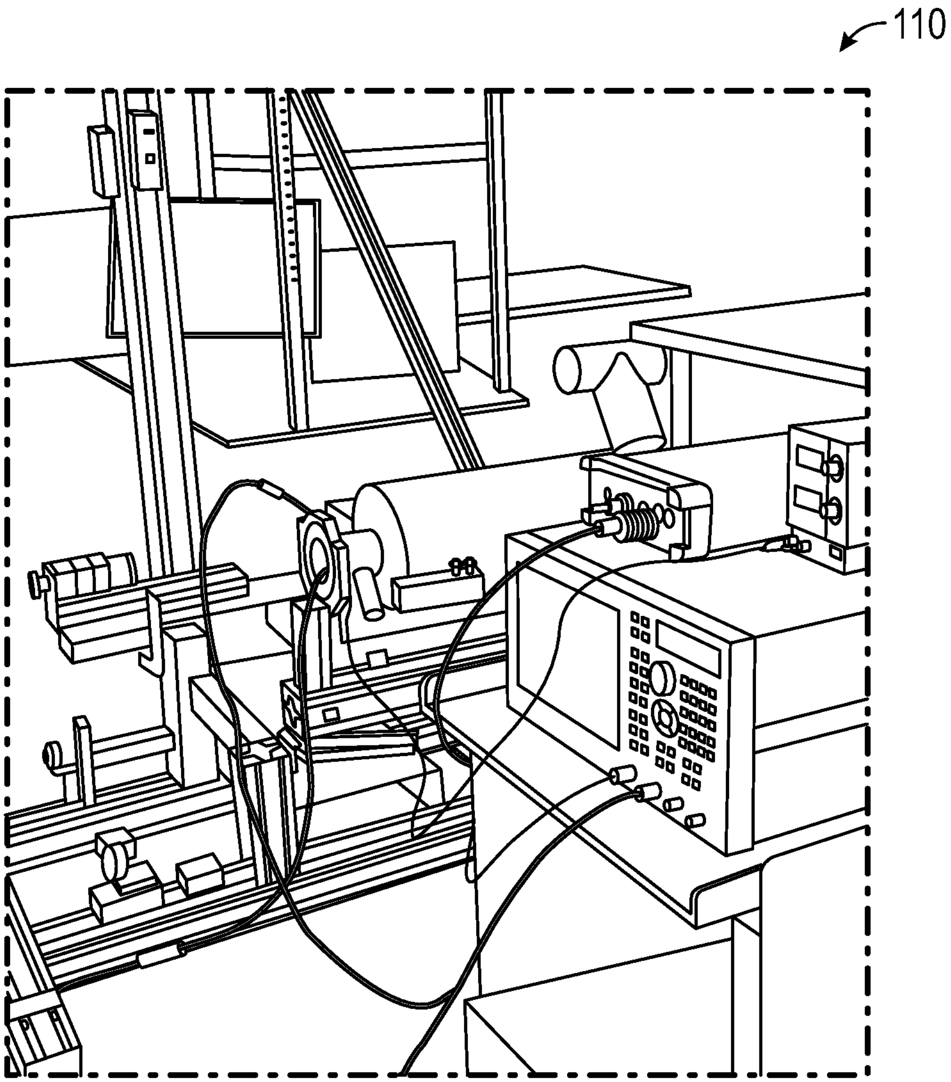
FIG. 18 illustrates an image of a balloon tuning set-up, in accordance with an example embodiment.

FIG. 18 illustrates an image of an example balloon-tuning set-up 110, in accordance with an example embodiment. It should be appreciated that the image shown in FIG. 18 is a laboratory set up only and that variations to this depicted arrangement are likely. The particular arrangement shown in FIG. 18 and elsewhere herein is not a limiting feature of the disclosed embodiments.

Figure 19:
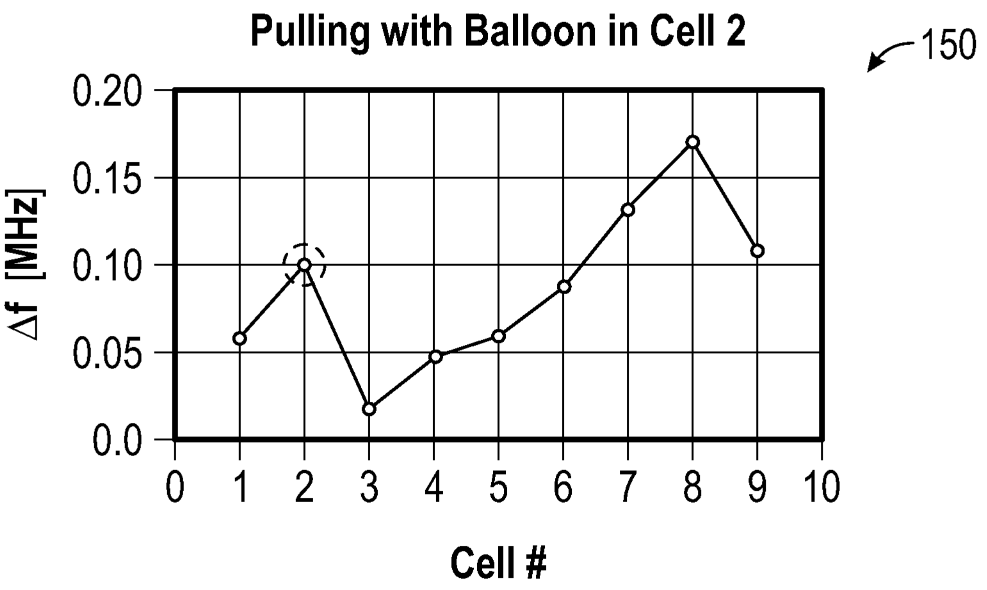
FIG. 19 illustrates a graph of maximized frequency change, in accordance with an example embodiment.

FIG. 19 illustrates a graph 150 of maximized frequency change, in accordance with an example embodiment. The graph 150 shown in FIG. 19 plots the cell number (x-axis) versus the change in frequency (y-axis). Pulling with the balloon in cell 2 is demonstrated by the data plotted in graph 150.

Figure 20:
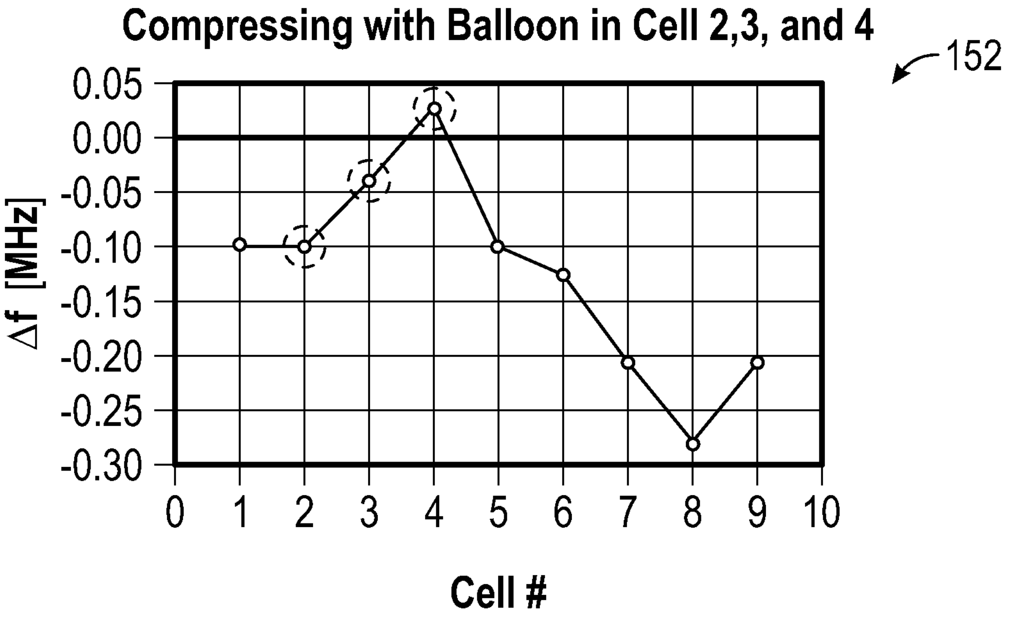
FIG. 20 illustrates a graph of minimized frequency change, in accordance with an example embodiment.

FIG. 20 illustrates a graph 152 of minimized frequency change, in accordance with an example embodiment. The graph 152 shown in FIG. 20 also plots the cell number (x-axis) versus the change in frequency (y-axis). Compressing with the balloon in cell 2, 3, and 4 is demonstrated graph 152.

Figure 21:
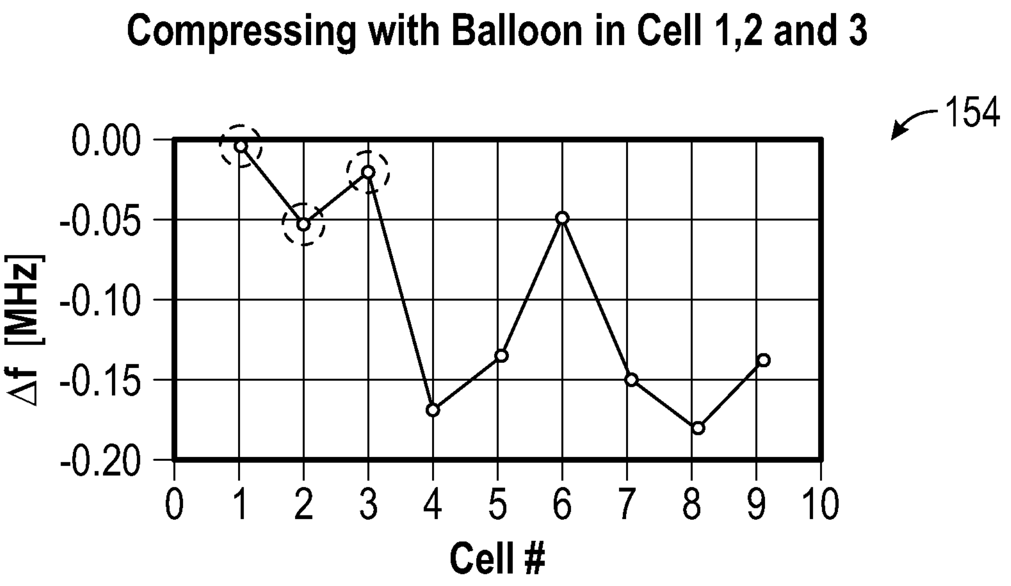
FIG. 21 illustrates a graph of frequency changes of cell frequencies, in accordance with an example embodiment.

FIG. 21 illustrates a graph 154 of frequency changes of cell frequencies, in accordance with an example embodiment. The data plotted as shown in FIGS. 19, 20 and 21 illustrate the results of balloon tuning with respect to a dressed cavity (e.g., TB9AES018). The graphs include data regarding the calculated frequency per cell, and further demonstrate initially pulling (but cell #8 was softer than the others), following by compression. In addition, these plots demonstrate frequency changes of cell frequencies, which indicates that that the use of pressurized balloons as discussed herein effectively induces the desired effect on targeted cells.

Figure 22:
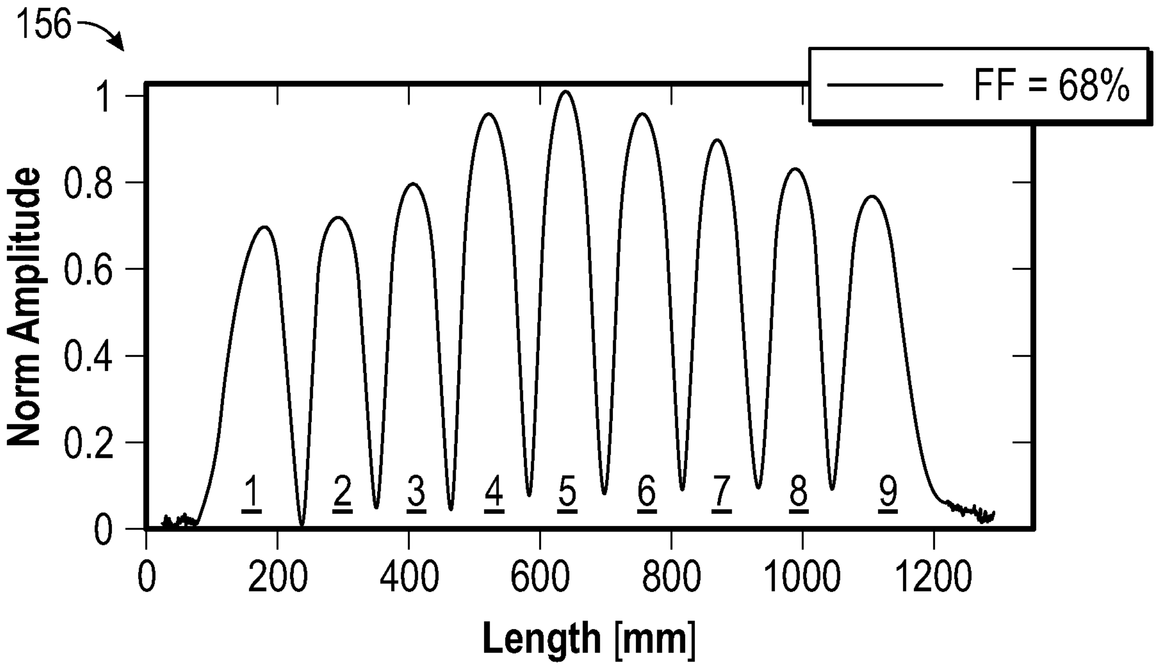
FIG. 22 illustrates a graph of data for the disclosed balloon turning technique applied to SRF cavities, in accordance with an example embodiment.

FIG. 22 illustrates a graph 156 of data for the disclosed balloon turning technique applied to SRF cavities, in accordance with an example embodiment. The sample graph 156 plots data collected as a result of a TB9-AES018 tuning procedure and plots norm amplitude (x-axis) versus length (y-axis). Initial conditions were $f_0$=1298.120 MHz and FF=0.68. The target frequency and FF are $f_0$=1297.95 MHz and FF≥0.9. The LCLS-11 specifications are FF >90% and 1297.91<$f_0$<1298.120 MHz.

Figure 23:
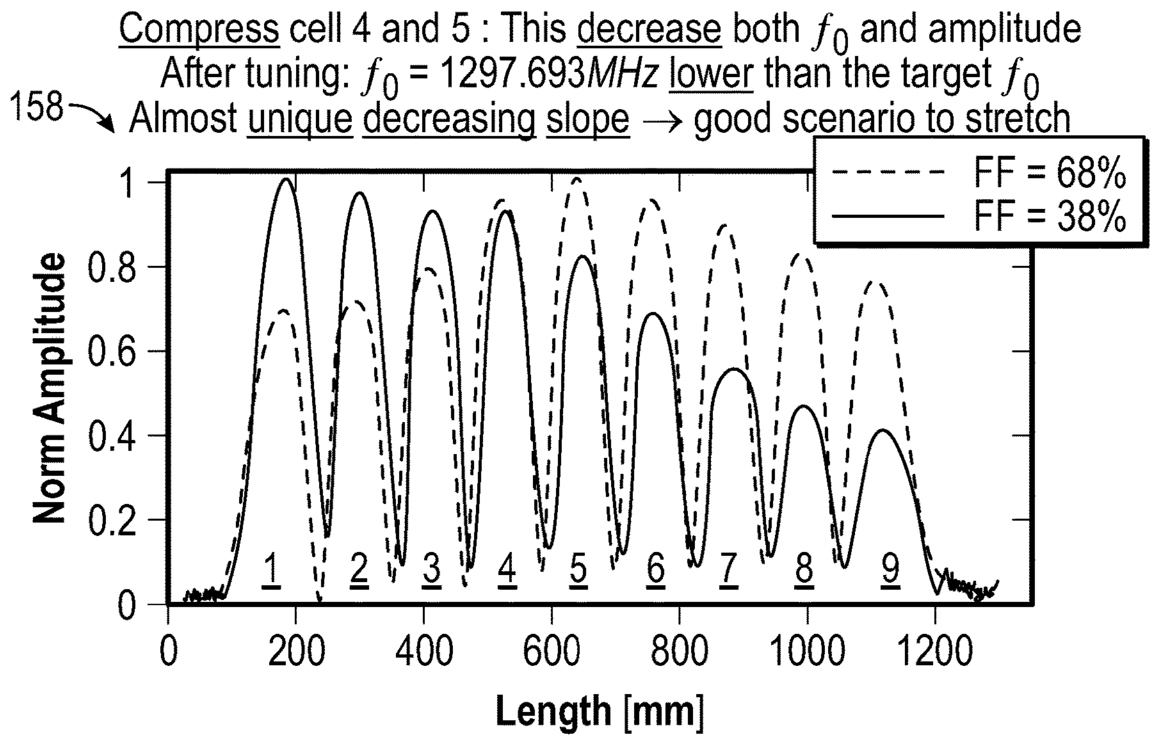
FIG. 23 illustrates a graph of data for the disclosed balloon turning technique applied to SRF cavities, in accordance with another example embodiment.
Figure 24:
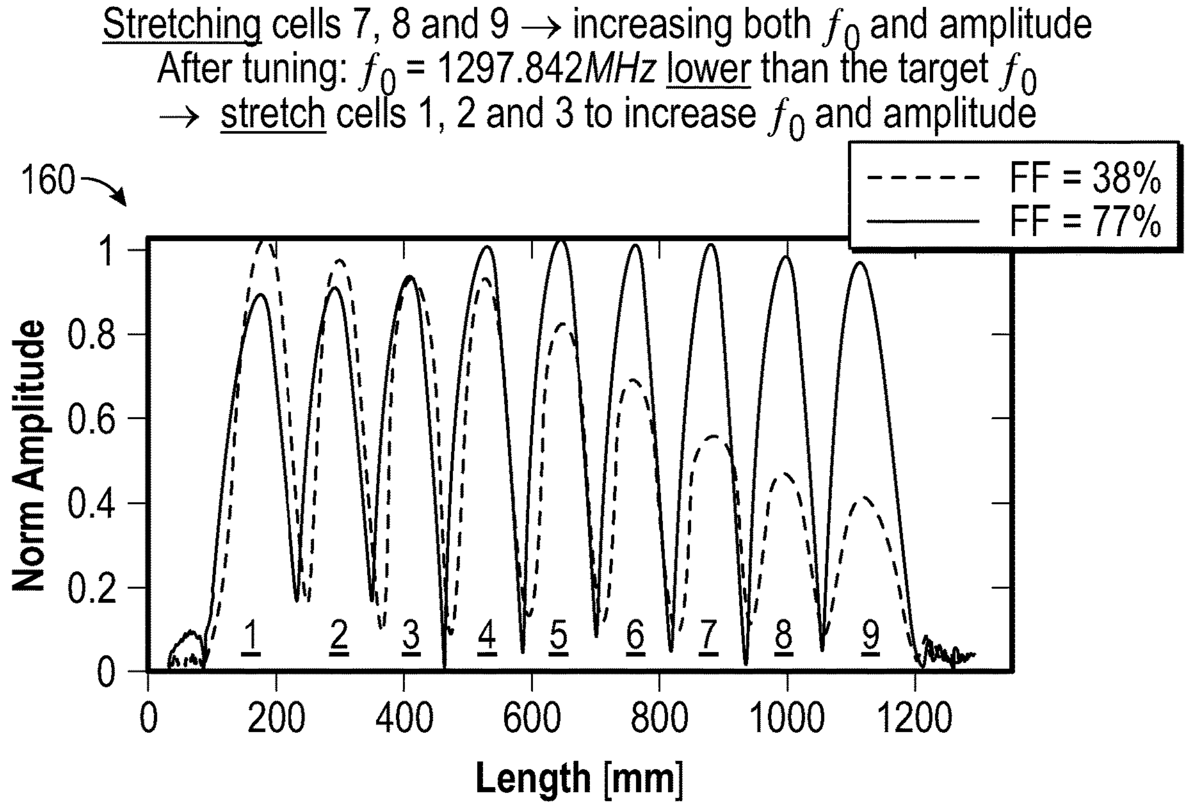
FIG. 24 illustrates a graph of data for the disclosed balloon turning technique applied to SRF cavities, in accordance with yet another example embodiment.
Figure 25:
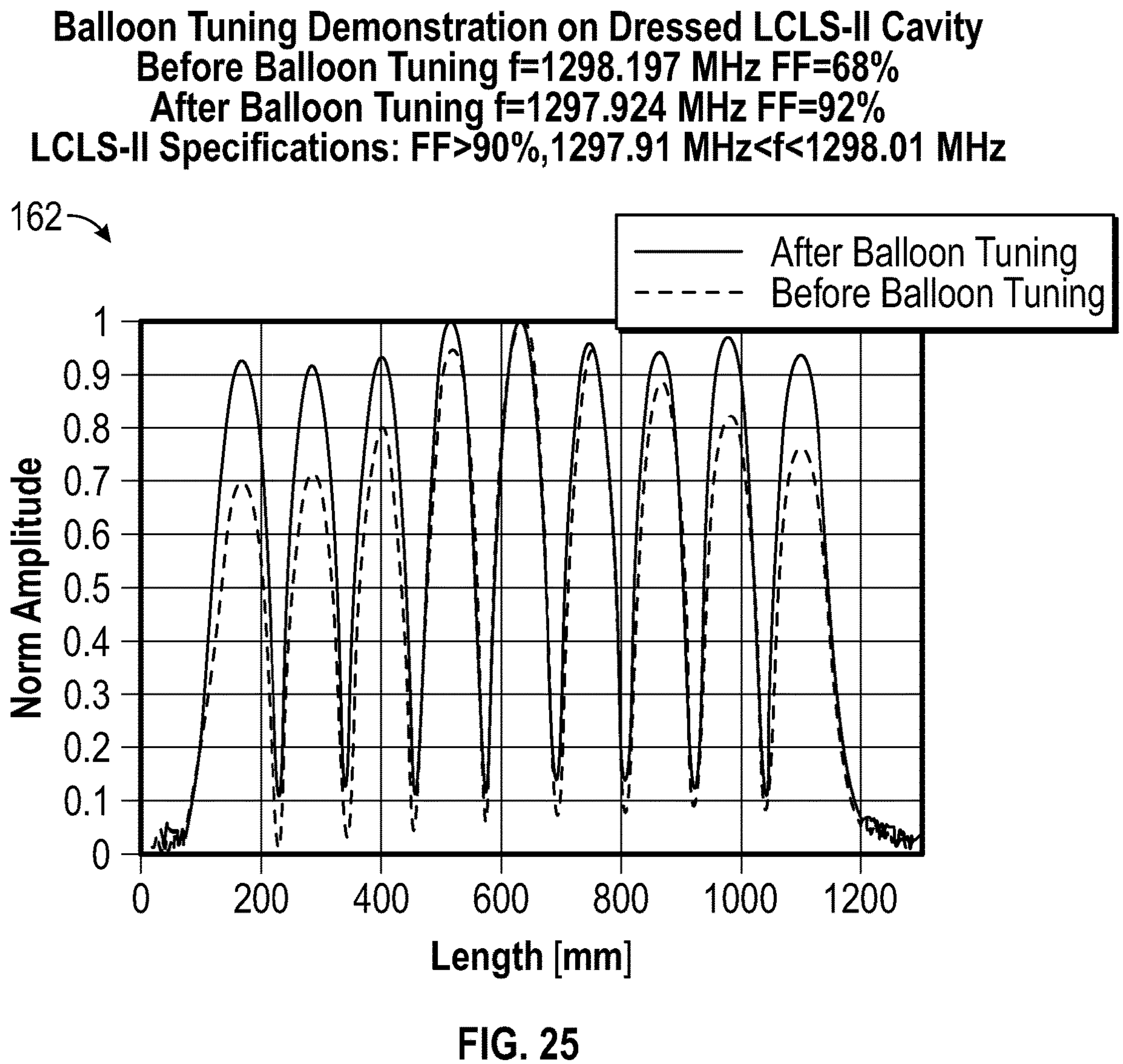
FIG. 25 illustrates a graph depicting data indicative of balloon tuning, in accordance with an example embodiment.

FIGS. 23, 24, and 25 respectively illustrate graphs 158, 160, and 162, which plot data collected as result of the disclosed balloon turning technique applied to SRF cavities, in accordance with varying experimental embodiments. FIG. 23 relates to compression with respect to cells #4 and #5. FIG. 24 relates to stretching cells #7, #8, and #9.

FIG. 25 illustrates a graph 162 depicting data indicative of balloon tuning, in accordance with another example embodiment. The graph 162 demonstrates the following parameters: Before Balloon Tuning f=1298.197 MHz FF=68%; and After Balloon Tuning f=1297.924 MHz FF=92%. This data represents successful results from an experimental embodiment of the disclosed approach with respect to a dressed cavity. The resonant frequency (f) and field flatness (FF) meet, for example the LCLS-II specifications (i.e., Linac Coherent Light Source—an approximately one billion dollar accelerator project for which the cavity was built).

It can be appreciated that the disclosed balloon technique has been implemented to successfully bring an LCLS-II multicell elliptical cavity back to specification after being accidentally detuned during a pressure test. The cavity was also qualified after balloon tuning with no degradation in quality factor and gradient, proving that the used balloon material can be cleaned with residuals on the inner cavity surface.

Figure 26:
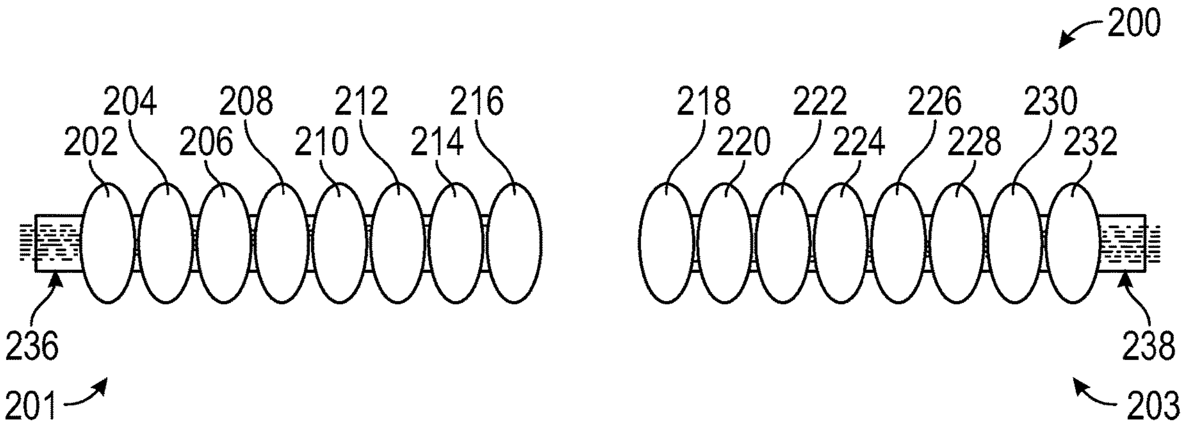
FIG. 26 illustrates a schematic diagram of a multi balloons arrangement with individual pressure lines for the automatic tuning of multicell cavities, in accordance with an embodiment.

FIG. 26 illustrates a schematic diagram of a multi-balloon arrangement with individual pressure lines for the automatic tuning system 200 of multicell cavities, in accordance with an embodiment. A pair of inflate/deflate rods with an independent air supply for each balloon 236, 238 can be inserted in the cavity from each side of the beamline. Such rods are capable of inflating or deflating any of the balloons 202, 204, 206, 208, 210, 212, 214, 216, 218, 220, 222, 224, 226, 228, 230, 232 without affecting the others. Such rods can be automatically inserted or removed from the cavity by controlled motorized motions on rails. The system may be utilized as part of an automatic tuning procedure, in accordance with an embodiment.

FIG. 26 thus illustrates a schematic diagram of the automatic balloon tuning system 200 having components, which may be utilized as part of an automatic tuning procedure, in accordance with an embodiment. Note that the automatic balloon tuning system 200 shown in FIG. 26 is an alternative version or alternative embodiment of the manual balloon tuning system discussed previously.

The automatic balloon tuning system 200 can be composed of two sections 201 and 203 to be inserted from each side of the cavity. The section 201 thus can include a group of balloons including the balloon 202, the balloon 204, the balloon 206, the balloon 208, the balloon 210, the balloon 212, the balloon 212, the balloon 214, and the balloon 216. The section 203 can incude a group of balloons including the balloon 218, the balloon 220, the balloon 222, the balloon 224, the balloon 226, the balloon 228, the balloon 230, and the balloon 232.

The automatic balloon tuning system 200 can include a pair of inflate/deflate rods 236 and 238 with an independent air supply for each balloon. The rod 236 is associated with the section 201 and the rod 238 is associated with the section 203. The rods 236 and 238 capable of inflating or deflating any of the balloons without affecting the others. the rods 236 and 238 can be automatically inserted or removed from a cavity by controlled motorized motions on rails. In addition, an automatic bead insertion mechanism (not shown in FIG. 26) which may be configured as a telescoping rod on rails can be connected to a fishing line with a bead that can be inserted through a cavity to a motorized wheel (not shown in FIG. 26).

Figure 27:
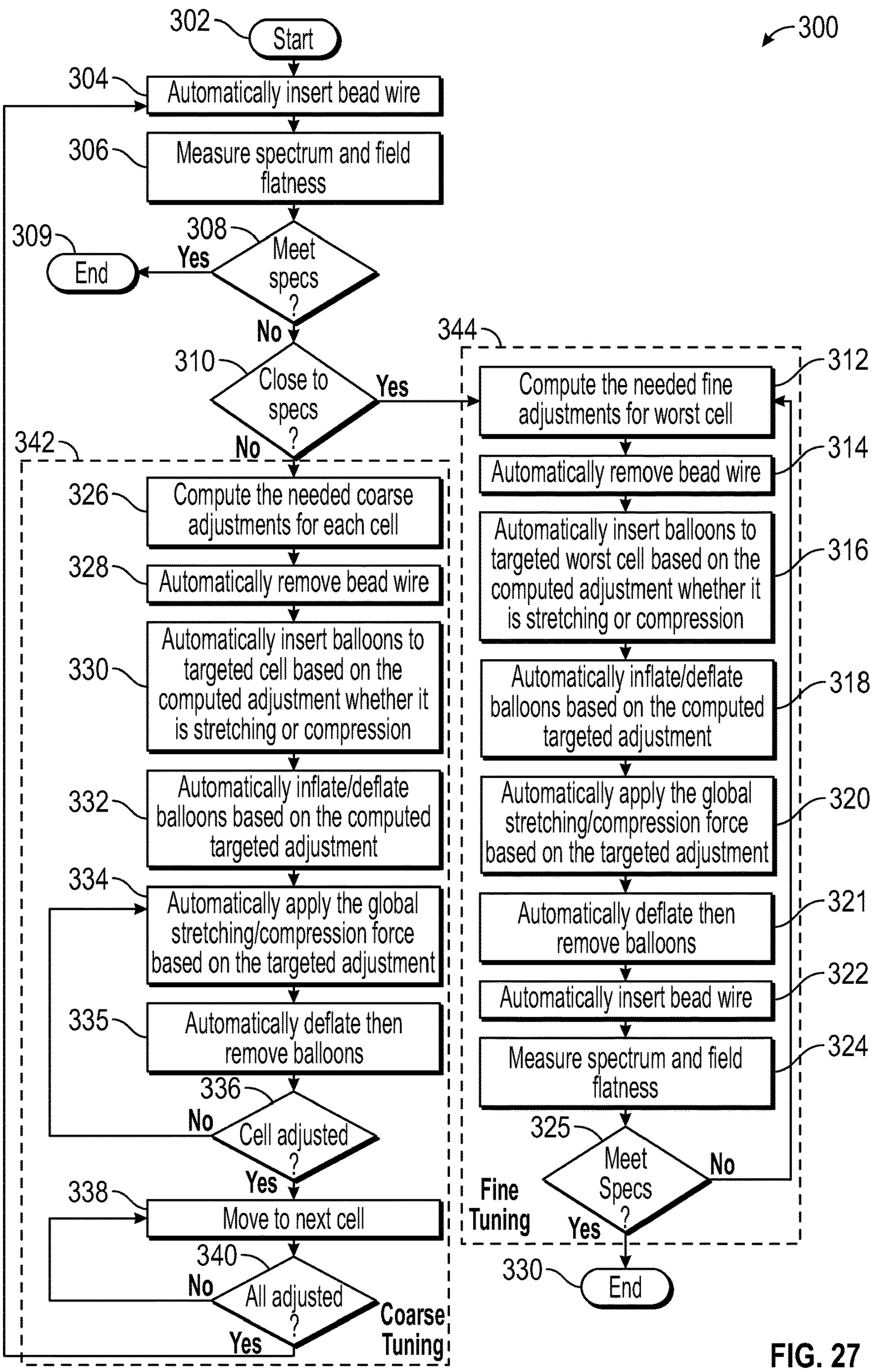
FIG. 27 illustrates a flow chart of operations depicting logical operational steps of a method for the automatic tuning of an SRF linear accelerator system, in accordance with an embodiment.

FIG. 27 illustrates a flow chart of operations depicting logical operational steps of a method 300 for the automatic tuning of an SRF multicell cavity, in accordance with an embodiment. As indicated at block 302, the process can be initiated. Next, as shown at block 304, a step or operation can be implemented in which a bead wire is automatically inserted. Thereafter, as depicted at block 306, a step or operation can be implemented in which the spectrum and field flatness are measured. Then, as shown at decision block 308, a test can be performed to determine if the measurements meet the specifications ("specs"). If yes ("Yes"), then the process ends, as indicated at block 309. If not, then as indicated next at decision block 310, a test can be performed to determine if the measurements are close to the specifications.

If the measurements are not close ("No") to the specifications, then coarse tuning operations can be implemented as indicated by the coarse tuning block 342 depicted in FIG. 2. The coarse tuning block 342 includes the steps or operations depicted at blocks 326, 328, 330, 332, 334, 335, 336, 338, and 340. If the measurements are found to be close to the specifications, then fine-tuning operations can be implemented as indicated by the fine-tuning block 344 shown in FIG. 27. The fine-tuning block includes the steps or operations depicted at blocks 312, 314, 316, 318, 320, 321, 322, 324, and 325.

Regarding the coarse tuning operations, a step or operation can be implemented, as shown at block 326, to compute the needed coarse adjustments for each cell. Thereafter, as shown at block 328, a step or operation can be implemented to automatically remove a bead wire. Next, as indicated at block 330, a step or operation can be implemented to automatically insert balloons to a targeted cell based on the computed adjustment, whether it is stretching or subject to compression. Then, as shown at block 332, a step or operation can be implemented to automatically inflate/deflate balloons based on the computed targeted adjustment. Then, as indicated at block 334, a step or operation can be implemented to automatically apply the global stretching/compression force based on the targeted mechanism. Then, as shown at block 335 the balloons can be deflated and removed, Thereafter, as shown at decision block 336, a test can be performed to determine if the cell has been adjusted. If not, the step or operation shown at block 334 can be repeated. If so, then as indicated next at block 338, a step or operation can be implemented to move to the next cell. Thereafter, as depicted at decision block 340, a test can be performed to determine if all adjustments have been completed. If so, then the operations beginning with those depicted at block 304 and so on, can be repeated. If not, then the operation depicted at block 338 can be repeated.

Thus, once coarse tuning is completed and the cavity is close to specs, the fine-tuning operations shown in the fine-tuning block 344 can begin, as depicted at block 312. That is, block 312 illustrates a step or operation, which can be implemented to compute the needed fine adjustments for the worst cell. Then, as depicted at block 314, a step or operation can be implemented to automatically remove a bead wire. Next, as illustrated at block 316, a step or operation can be implemented to automatically insert balloons to target the "worst" cell based on a computed adjustment of whether it is stretching or subject to compression.

Thereafter, as indicated at block 318, a step or operation can be implemented to automatically inflate/deflate balloons (e.g., balloons 202, 204, 206, 208, 210, 212, 214, 216 and/or balloons 218, 220, 224, 226, 228, 230, 232, 234) based on the computed targeted adjustment. Next, as shown at block 320, a step or operation can be implemented to automatically apply the global stretching/compression force based on the targeted mechanism. Then, as indicated at block 321, the balloons can be automatically deflated and removed. Thereafter, as shown at block 322, the bead wire can be automatically inserted. Then, as shown at block 324, a step or operation can be implemented wherein the spectrum and field flatness can be measured. Next, as shown at decision block 325, a test can be performed to determine if the specifications have been met. If not ("No"), then the operations beginning with those shown at block 312 and so on can be repeated. If so ("Yes"), then, as indicated at block 330, the process can end.

Note that without loss of generality, the disclosed balloons can be used to assist localized mechanical deformation of multi-cell/section hollow mechanical structures that are not externally accessible for any reason as long as the balloons can be inserted inside the structure. The hollow multi-cell/section mechanical structure can be of arbitrary number of cells/sections and cells/sections can of be arbitrary shape and not necessarily identical.

As can be appreciated by one skilled in the art, at least some of the disclosed embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages or in a visually oriented programming environment.

The program code may execute entirely on a user's computer, partly on a user's computer, as a stand-alone software package, partly on a user's computer and partly on a remote computer or entirely on the remote computer. In the latter scenario, the remote computer may be connected to a user's computer through a bidirectional data communications network (e.g., a local area network (LAN), wide area network (WAN), wireless data network, a cellular network, etc.) or the bidirectional connection may be made to an external computer via most third party supported networks (e.g., through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 28:
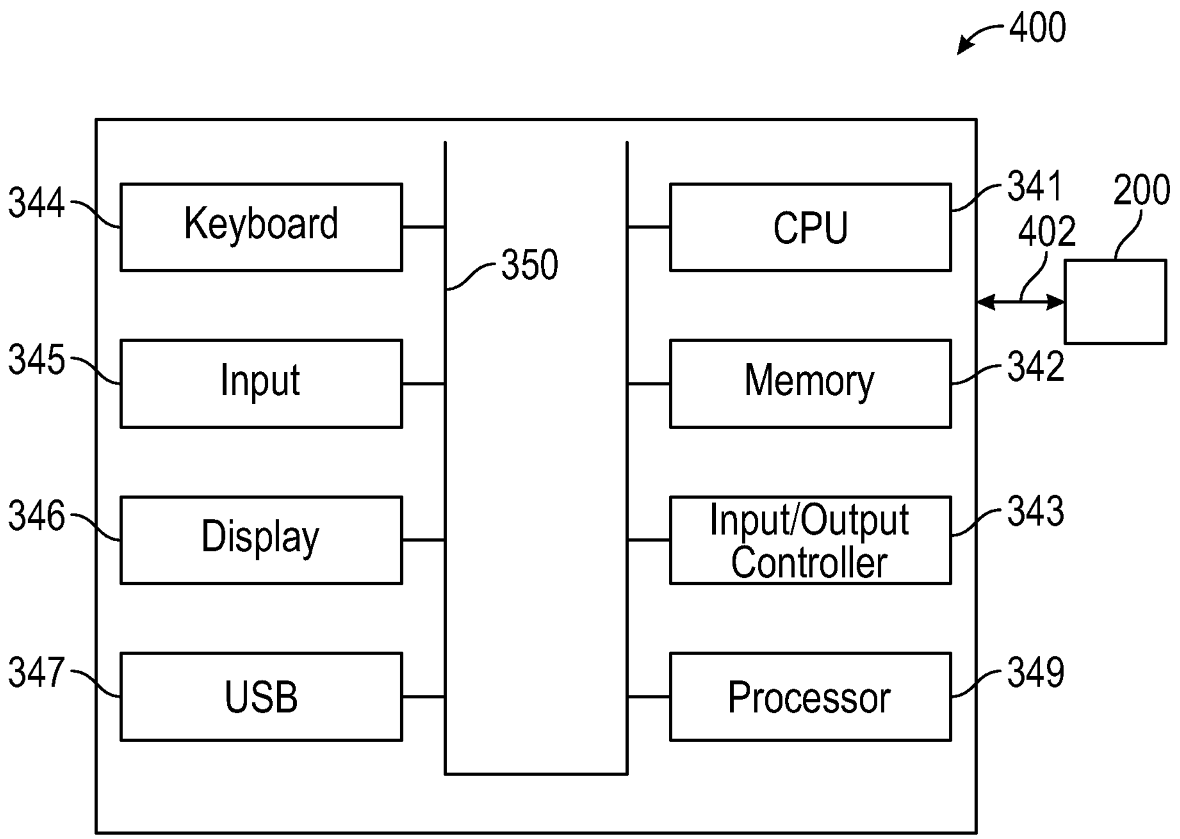
FIG. 28 illustrates a schematic view of a computer system, in accordance with an embodiment.
Figure 29:
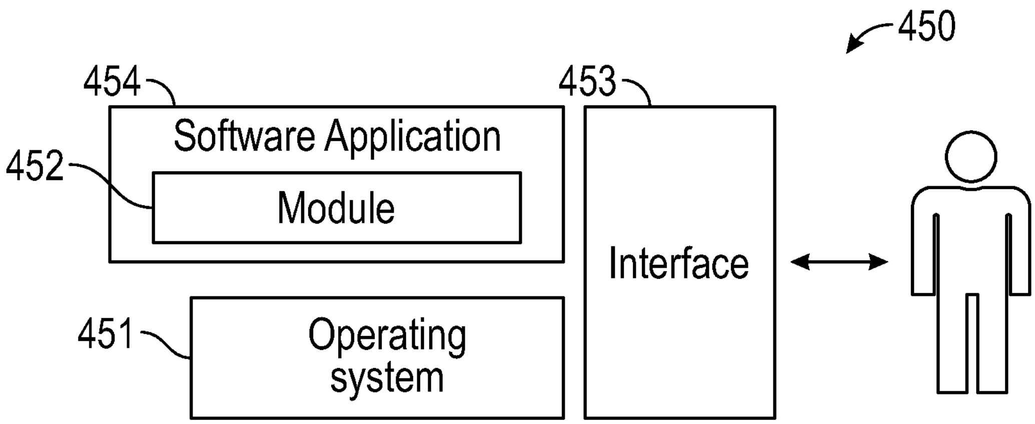
FIG. 29 illustrates a schematic view of a software system including a module, an operating system, and a user interface, in accordance with an embodiment.

FIGS. 28-29 are shown only as exemplary diagrams of data-processing environments in which example embodiments may be implemented. It should be appreciated that FIGS. 28-29 are only exemplary and are not intended to assert or imply any limitation with regard to the environments in which aspects or embodiments may be implemented. Many modifications to the depicted environments may be made without departing from the spirit and scope of the disclosed embodiments.

As illustrated in FIG. 28, some embodiments may be implemented in the context of a data-processing system 400 that can include, for example, one or more processors including a CPU (Central Processing Unit) 341 and/or other another processor 349 (e.g., microprocessor, microcontroller etc), a memory 342, an input/output controller 343, a peripheral USB (Universal Serial Bus) connection 347, a keyboard 344 and/or another input device 345 (e.g., a pointing device such as a mouse, trackball, pen device, etc.), a display 346 (e.g., a monitor, touch screen display, etc) and/or other peripheral connections and components. FIG. 28 is an example of a computing device that can be adapted for use in accordance with one possible embodiment.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device, a networked computer server, and so on, wherein each such device can be operably connected to and/or in communication with a client-server based network or other types of networks (e.g., cellular networks, Wi-Fi, etc). The data-processing system 400 can communicate with other devices or systems (e.g., the previously discussed automatic balloon tuning system 200). Communication between the data-processing system 400 and the automatic balloon tuning system 200 can be bidirectional, as indicated by the double arrow 402. Such bidirectional communications may be facilitated by, for example, a computer network, including wireless bidirectional data communications networks.

FIG. 29 illustrates a computer software system 450 for directing the operation of the data-processing system 400 depicted in FIG. 28. Software application 454, stored for example in the memory 342 can generally include one or more modules, an example of which is module 452. The computer software system 450 also can include a kernel or operating system 451 and a shell or interface 453. One or more application programs, such as software application 454, may be "loaded" (i.e., transferred from, for example, mass storage or another memory location into the memory 342) for execution by the data-processing system 400.

The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user shown at the right side of FIG. 29 may supply additional inputs or can terminate a session. The software application 454 can include module(s) 452, which can, for example, implement instructions or operations such as those discussed herein. Module 452 may also be composed of a group of modules and/or sub-modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. A module may be composed of two parts: an interface, which lists the constants, data types, variable, and routines that can be accessed by other modules or routines, and an implementation, which may be private (e.g., accessible only to that module) and which can include source code that actually implements the routines in the module. The term module can also refer to an application, such as a computer program designed to assist in the performance of a specific task, such as word processing, accounting, inventory management, etc. A module may also refer to a physical hardware component or a combination of hardware and software.

The module 452 may include instructions (e.g., steps or operations) for performing operations such as those discussed herein. For example, module 452 may include instructions for implementing the various steps or operations of the method 300 shown in the various blocks illustrated and described herein with respect to FIG. 27.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system for automatically tuning hollow structures, the system comprising:

a plurality of pressurized balloons located in at least one targeted cell of a hollow structure of a device having a plurality of hollow structures and a plurality of respective cells, wherein at least one pressurized balloon among the plurality of pressurized balloons is inserted into the at least one targeted cell so as to localize plastic deformation to the at least one targeted cell using prescribed values of global force and balloon pressure with respect to the at least one pressurized balloon; and a pair of inflate/deflate rods associated with an independent air supply for the at least one pressurized balloon, wherein the pair of inflate/deflate rods inflates or deflates the at least one pressurized balloon without affecting other pressurized balloons among the plurality of pressurized balloons, wherein the pair of inflate/deflate rods is automatically insertable or removable from the hollow structure by controlled motorized motions.

2. The system of claim 1 further comprising an automatic bead insertion/removal telescope mechanism that inserts into or removes a bead from the hollow structure.

3. The system of claim 1 wherein the at least one pressurized balloon is subject to automatic coarse tuning operations.

4. The system of claim 1 wherein the at least one pressurized balloon is subject to automatic fine-tuning operations.

5. The system of claim 1 wherein the device comprises an SRF (Superconducting Radio Frequency) cavity for use in a particle accelerator.

6. The system of claim 5 wherein the pair of inflate/deflate rods carry the at least one pressurized balloon, wherein the pair of inflate/deflate rods is automatically inserted or removed from the SRF cavity by controlled motorized motions at least one rail.

7. The system of claim 1 wherein the at least one pressurized balloon comprises a rubberized/nylon balloon.

8. The system of claim 1 wherein the hollow structure comprises a cavity.

9. The system of claim 8 wherein the cavity comprises at least one of: a multicell elliptical cavity among a plurality of adjacent cavities, a dressed multicell cavity among a plurality of adjacent cavities.

10. system of claim 1 wherein the hollow structure comprises a filter.

11. The system of claim 1 wherein the at least one pressurized balloon is subject to at least one of: automatic fine-tuning operations and automatic coarse tuning operations.

12. A system for automatically tuning hollow structures, the system comprising:

a plurality of pressurized balloons located in at least one targeted cell of a hollow structure of a device having a plurality of hollow structures and a plurality of respective cells, wherein at least one pressurized balloon among the plurality of pressurized balloons is inserted into the at least one targeted cell so as to localize plastic deformation to the at least one targeted cell using prescribed values of global force and balloon pressure with respect to the at least one pressurized balloon;

a pair of inflate/deflate rods associated with an independent air supply for the at least one pressurized balloon, wherein the pair of inflate/deflate rods inflates or deflates the at least one pressurized balloon without affecting other pressurized balloons among the plurality of pressurized balloons, wherein the pair of inflate/deflate rods is automatically insertable or removable from the hollow structure by controlled motorized motions; and an automatic bead insertion mechanism that inserts a bead into the hollow structure.

13. A method for automatically tuning hollow structures, comprising:

locating a plurality of pressurized balloons in at least one targeted cell of a hollow structure of a device having a plurality of hollow structures and a plurality of respective cells;

inserting at least one pressurized balloon among the plurality of pressurized balloons into the at least one targeted cell so as to localize plastic deformation to the at least one targeted cell using prescribed values of global force and balloon pressure with respect to the at least one pressurized balloon;

associating a pair of inflate/deflate rods with an independent air supply for the at least one pressurized balloon; and inflating or deflating the at least one pressurized balloon with the pair of inflate/deflate rods without affecting other pressurized balloons among the plurality of pressurized balloons, wherein the pair of inflate/deflate rods is automatically insertable or removable from the hollow structure by controlled motorized motions.

14. The method of claim 13 further comprising inserting into or removing a bead from the hollow structure with an automatic bead insertion/removal telescope mechanism that inserts into or removes the bead from the hollow structure.

15. The method of claim 13 further comprising subjecting the at least one pressurized balloon to automatic coarse tuning operations.

16. The method of claim 13 further comprising subjecting the at least one pressurized balloon to automatic fine-tuning operations.

17. The method of claim 13 wherein the device comprises an SRF (Superconducting Radio Frequency) cavity for use in a particle accelerator.

18. The method of claim 17 wherein the pair of inflate/deflate rods carry the at least one pressurized balloon, wherein the pair of inflate/deflate rods is automatically inserted or removed from the SRF cavity by controlled motorized motions at least one rail.

19. The method of claim 13 wherein the at least one pressurized balloon comprises a rubberized/nylon balloon.

20. The method of claim 13 wherein the hollow structure comprises a cavity comprising at least one of: a multicell elliptical cavity among a plurality of adjacent cavities, and a dressed multicell cavity among a plurality of adjacent cavities.

* * * * *